United States Patent
Agarwal et al.

(10) Patent No.: US 11,592,830 B2
(45) Date of Patent: Feb. 28, 2023

(54) TRAJECTORY GENERATION USING LATERAL OFFSET BIASING

(71) Applicant: Zoox, Inc., Foster City, CA (US)

(72) Inventors: Kshitij Agarwal, Redwood City, CA (US); David Martins Belo, San Francisco, CA (US); Johannes Andreas Huennekens, Los Gatos, CA (US)

(73) Assignee: Zoox, Inc., Foster City, CA (US)

( * ) Notice: Subject to any disclaimer, the term of this patent is extended or adjusted under 35 U.S.C. 154(b) by 232 days.

(21) Appl. No.: 16/887,712

(22) Filed: May 29, 2020

(65) Prior Publication Data

US 2021/0373566 A1    Dec. 2, 2021

(51) Int. Cl.
*B60W 40/072* (2012.01)
*G05D 1/02* (2020.01)
*B60W 40/109* (2012.01)

(52) U.S. Cl.
CPC ......... *G05D 1/0223* (2013.01); *B60W 40/072* (2013.01); *B60W 40/109* (2013.01); *G05D 1/0219* (2013.01); *B60W 2552/30* (2020.02); *B60W 2720/125* (2013.01)

(58) Field of Classification Search
CPC ............... G05D 1/0212; G05D 1/0223; G05D 1/0088; G05D 2201/0213; B60W 40/072; B60W 2552/30; B60W 30/18145; B60W 2720/12; B60W 2720/125; B60W 2520/125; B60W 40/109
USPC .......... 701/27, 23, 41, 466, 70, 72; 180/167, 180/170
See application file for complete search history.

(56) References Cited

U.S. PATENT DOCUMENTS

| | | | |
|---|---|---|---|
| 11,180,144 B2* | 11/2021 | Ohmura | B60W 30/165 |
| 2018/0099667 A1* | 4/2018 | Abe | G06V 20/588 |
| 2018/0188734 A1* | 7/2018 | Zhu | B60W 30/095 |
| 2018/0350391 A1 | 12/2018 | Moore | |
| 2019/0278284 A1* | 9/2019 | Zhang | G05D 1/0223 |
| 2019/0308621 A1* | 10/2019 | Inou | B60W 30/095 |
| 2019/0361450 A1 | 11/2019 | Sheckells | |
| 2020/0047752 A1* | 2/2020 | Ivanovic | B60W 30/12 |

FOREIGN PATENT DOCUMENTS

| | | |
|---|---|---|
| GB | 2570887 A | 8/2019 |
| WO | WO2019236790 A1 | 12/2019 |

OTHER PUBLICATIONS

PCT Search Report and Written Opinion dated Aug. 8, 2021 for PCT Application No. PCT/US21/34541, 9 pages.

* cited by examiner

*Primary Examiner* — Dalena Tran
(74) *Attorney, Agent, or Firm* — Lee & Hayes, P.C.

(57) ABSTRACT

A trajectory for a vehicle can be generated using a lateral offset bias. The vehicle, such as an autonomous vehicle (AV), may be directed to follow reference trajectory for through an environment. The AV may determine a segment associated with the reference trajectory based on curvatures of the reference trajectory, determine a lateral offset bias associated with the segment based at least in part on, for example, one or more of a speed or acceleration of the vehicle, and determine a candidate trajectory for the autonomous vehicle based at least in part on the lateral offset bias. The candidate trajectory may then be used to control the autonomous vehicle.

20 Claims, 11 Drawing Sheets

TRAJECTORY GENERATION USING LATERAL OFFSET BIASING

BACKGROUND

Various methods, apparatuses, and systems are utilized by autonomous vehicles to guide such autonomous vehicles through environments including various static and dynamic objects. For instance, autonomous vehicles may utilize route planning methods, apparatuses, and systems to guide autonomous vehicles through congested areas with other moving vehicles (autonomous or otherwise), moving people, stationary buildings, etc. In some examples, a vehicle may not follow an intended route which may lead to inaccurate or imprecise vehicle handling.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
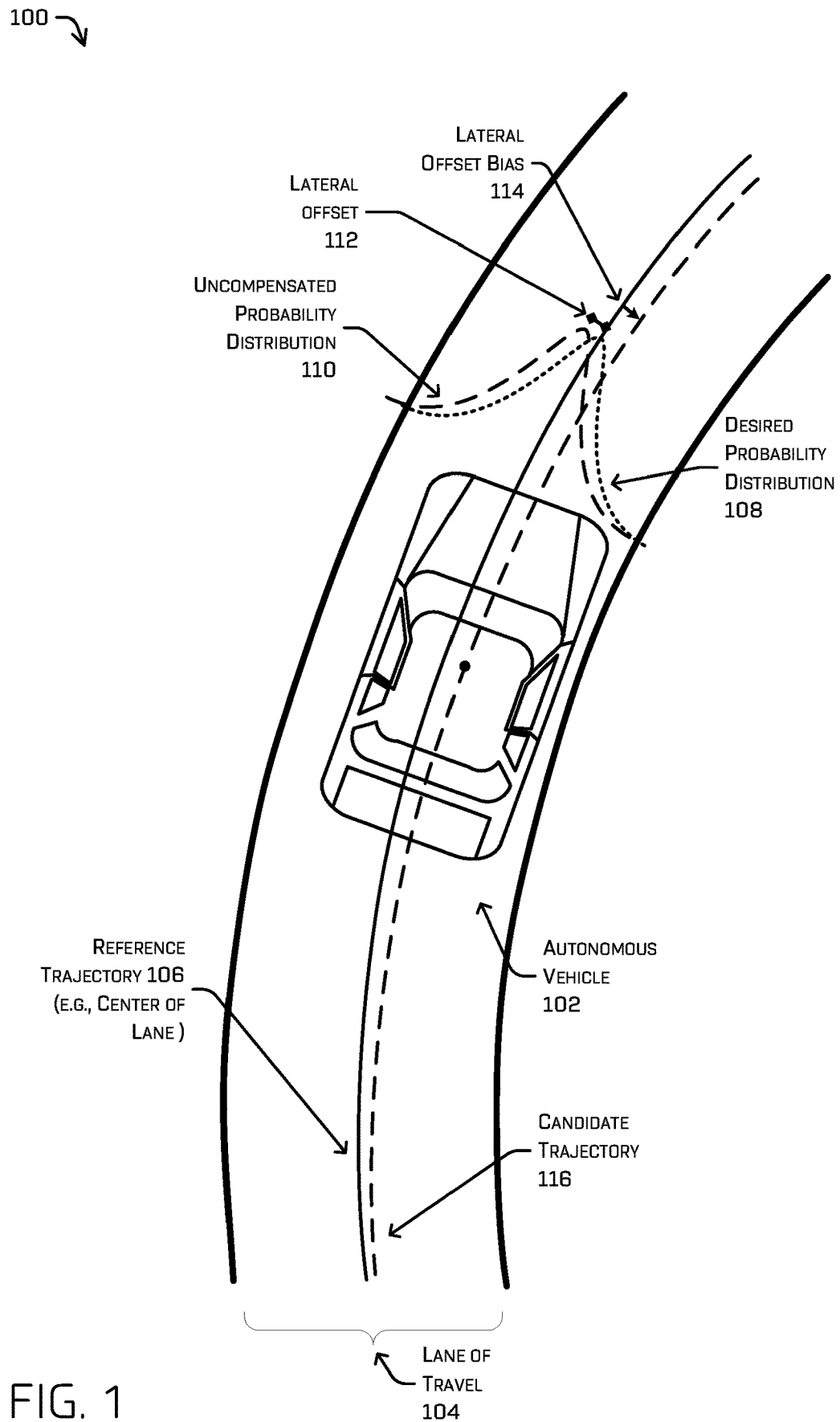
FIG. 1 depicts an example scenario of providing a lateral offset bias with respect to a reference trajectory, in accordance with examples of the disclosure.

This disclosure describes methods, apparatuses, and systems for determining a trajectory for a vehicle using a lateral offset bias. In some instances, a decision planner component of an autonomous vehicle, for example, can receive a reference trajectory, which may correspond to a default or initial trajectory for an autonomous vehicle to traverse through an environment, such as a center of a road segment. Despite such a default trajectory, various factors may make a trajectory that deviates from the default trajectory desirable. For example, cornering or navigating curves in the road at different speeds may make trajectories that deviate from the center of the road desirable.

In some cases, when an autonomous vehicle is cornering, the lateral tracking error (e.g., the deviation from the intended trajectory) may not have a zero mean distribution because, for example, an error which causes the autonomous vehicle to drift toward traveling straight (e.g., decrease a cornering rate) may occur more "easily" than an error which causes the autonomous vehicle to drift toward an inside of the turn (e.g., increase a cornering rate). This may be due to, for example, difficulty in accurately accounting for vehicle dynamics and/or kinematics, such as, but not limited to, slip, complex controls, or otherwise, resulting in less precise control and/or tracking when negotiating a curved segment. Some examples herein may implement a lateral offset bias to address the lateral tracking error. A lateral offset bias may cause or bias the trajectory the autonomous vehicle travels to deviate from the reference trajectory toward one side (e.g., the inside) of curves in the road (e.g., toward a left side of a road when the road curves left and toward a right side of a road when the road curves right). In some examples, a trajectory that deviates from the center of the road toward an inside of a curve may allow for increased speed of travel without reducing safety due to accounting for any lateral tracking errors or controls.

Some examples herein may implement a lateral offset bias at least in part as a cost function in the determining of candidate trajectories that may reduce the cost of trajectories that deviate from the reference trajectory by some distance toward a side (the inside) of a curve in the road. Additionally or alternatively, some examples may implement a lateral offset bias at least in part by shifting the reference trajectory toward the inside of a curve in the road.

The amount of lateral offset bias may vary depending on the speed of travel, curvature of the segment, and/or lateral acceleration that will be experienced in a curve. For example, implementations utilizing a cost function to implement lateral offset bias may determine a lateral offset from the reference trajectory that has a lowest cost based on the speed of travel, curvature, and/or lateral acceleration that will be experienced in a curve. Such a determination may be performed using, for example, a look up table or by calculations performed in real time. Implementations that offset the reference trajectory to implement lateral offset bias may utilize the speed of travel, road curvature, road inclination, environmental conditions, and/or lateral acceleration to shift the reference trajectory from the center of road or may load a biased reference trajectory from a plurality of reference trajectories associated with speeds of travel, curvatures, and/or lateral accelerations, or the like.

The magnitude of the lateral offset bias provided may be determined based on the probability distribution of lateral tracking errors. For example, repeated simulations of a traversal of a simulated road segment may be performed while perturbing simulated environmental variables and vehicle condition variables to obtain simulated trajectories. The simulated trajectories followed in each simulation may be analyzed with respect to the reference trajectory to determine the probability distribution of lateral tracking errors. As mentioned above, when an autonomous vehicle is cornering, the lateral tracking error (e.g., the deviation from the intended trajectory) may not have a zero mean distribution because, for example, an error which causes the autonomous vehicle to drift toward traveling straight may occur more "easily" than an error which causes the autonomous vehicle to increase a cornering rate. The compensations discussed above may be determined to shift the center of the probability distribution to the center of the lane of travel.

For example, for a given speed of travel, road segment curvature, and/or lateral acceleration that will be experienced by an autonomous vehicle while traversing a curve, techniques according to this disclosure may determine that the centers of the probability distribution of lateral tracking errors (or otherwise mean, mode, or otherwise) is, for example, three inches from the center of the lane in the outward direction. As such, techniques herein may provide a lateral offset bias of three inches from the center toward the inside of the lane. However, this is merely an example and implementations are not limited to a lateral offset bias that center the distribution to the center of the lane of travel. Depending on the implementation, other factors, such as the standard deviation and/or skewness of the probability distribution, may also be considered such that the lateral offset bias may be less or more than the difference between the center of the lane of travel and the center of the probability distribution. Further, the distribution is not limited to a particular type of distribution and may include distributions that are Gaussian or non-Gaussian.

In some examples, a lateral offset bias may be provided with respect to segments of a reference trajectory. More particularly, a reference trajectory may be determined for the autonomous vehicle. The reference trajectory may be segmented based on, for example, curvature values of the reference trajectory. For example, the reference trajectory may be segmented where a sign of the curvature changes from a positive value to a negative value, or vice versa and/or where a change in the magnitude of curvature from a beginning of the segment exceeds a threshold. Of course, other variations are possible. For example, the segmentation may be performed to end a segment and begin a new segment where a change in the expected lateral acceleration or expected travel velocity from the beginning of the segment exceeds a threshold value.

Each segment may then be assigned a lateral offset bias. Of course, in those examples in which a portion of road has a continuously varying curvature, the road may be segmented into sections based at least in part on a speed of the vehicle travelling there on, a rate of change of curvature, or the like such that the lateral offset may be continuously determined.

As mentioned above, the form of the lateral offset bias may vary depending on the implementation. In some examples, the lateral offset bias may be assigned as a cost value that may bias or lower the cost for candidate trajectories determined for the segment which are offset from the reference trajectory in the direction of the lateral offset bias. In some examples, the lateral offset bias may be assigned by shifting the reference trajectory from the center of a lane of the segment or loading a biased reference trajectory for the segment from a plurality of reference trajectories.

Some examples may determine a trajectory for the vehicle to follow that may provide a lateral offset bias and compensation for other factors. More particularly, various factors may cause the autonomous vehicle to travel in a trajectory that deviates from the default trajectory (e.g., limitations of modeling, drift in sensors, limitations in actuators, changes in an environment (e.g., weather, time of day, time of year, etc.), etc.). As a non-limiting example, a reference trajectory may simply indicate to the vehicle to continue driving straight down a road, while the vehicle must actually compensate for avoiding potholes, other drivers encroaching on a lane, and a drift in GPS signal.

In some examples, a reference trajectory may be determined for the autonomous vehicle. Depending on the implementation, the reference trajectory may be a biased reference trajectory as discussed above or an unbiased reference trajectory (e.g., a center line of the lane the autonomous vehicle is to travel). An initial position of the autonomous vehicle (also referred to as a vehicle or robot) can be determined relative to the reference (or default) trajectory, including, for example, a lateral offset from the reference trajectory to a point of the vehicle, as well as an angular offset (e.g., a measure of the heading of the vehicle relative to a tangent in the reference trajectory). In addition to the initial position, an acceleration and a steering angle rate of the vehicle can be determined.

In order to return to, or more closely follow, the reference trajectory, the vehicle can follow a revised trajectory. Such a revised trajectory may be determined based on evaluating a cost of multiple candidate trajectories. Such costs may be computed by integrating the candidate trajectory as described herein. In some examples, (e.g., examples utilizing an unbiased reference trajectory), the costs may include or factor in a cost value that may bias or lower the cost for candidate trajectories determined for the segment which are toward the inside of a curve in the road as discussed above.

Because the candidate trajectories are required to continue operating the vehicle, they should be evaluated quickly. Integrating the candidate trajectories according the description herein may significantly outperform other methods of integration, both in time and in accuracy. For example, prior art techniques relying on constrained nonlinear programming methods based on a numerical approximation of vehicle dynamics can suffer from a lack of convergence and/or can be slow, often requiring 10 milliseconds to return a result. In contrast, the techniques discussed herein can guarantee convergence and can provide a result in less than 1 millisecond. In some instances, the techniques discussed herein can generate a revised trajectory by computing a trajectory using piecewise geometry to determine a closed-form analytical solution.

The reference trajectory can be divided into discrete portions and represented as frames. In some examples, frames may correspond to the above discussed segments of the reference trajectory used to assign lateral offset biases. More particularly, frames may be segmented where a sign of the curvature changes from a positive value to a negative value, or vice versa and/or where a change in the magnitude of curvature from a beginning of the frame exceeds a threshold. In other examples, the segmentation of frames may be performed to end a frame and begin a new frame where a change in the expected lateral acceleration or expected travel velocity from the beginning of the segment exceeds a threshold value. Additionally or alternatively, frames may be divided by equally-spaced points on the reference trajectory (e.g., where segments of the reference trajectory used to assign lateral offset biases are longer than a desired length for frames). In any case, a frame may be associated with a tangent vector and a curvature value associated with the point of the particular frame of the reference trajectory. Next, a reference line that is perpendicular to the tangent vector of a particular frame can be determined. Such a reference line may be used as a form of integration as a candidate trajectory can be propagated (or otherwise evolved in time) by intersecting a curved segment of the candidate trajectory with the reference line. An intersection point between the curved segment and the reference line becomes an origin for a next segment that spans from the intersection point to a reference line corresponding to the next frame. Repeating the operation provides a numeric form of geometric integration.

A candidate trajectory can comprise a plurality of segments spanning from an initial point (or a reference line) to a next reference line. Each segment can be defined, at least in part, by a curvature associated with the particular segment and a position relative to the reference trajectory. Further, the vehicle may also have a varying acceleration, velocity, steering angle, or steering angle rate at every point. One or more costs or constraints can be determined for a candidate trajectory. These constraints may be defined based on the geometry of the segment. For example, it may not be physically possible for one segment to have a large positive curvature curve and the next segment to have a large negative curvature. As such, one constraint may be to enforce continuity between segments. Further constraints include considering the steering angle of one segment and the curvature of the next. In examples providing a lateral offset bias through cost functions, the costs for the candidate trajectories may include the lateral offset bias functions. In examples where the reference trajectory frames are the same as the segments of the reference trajectory used to assign lateral offset biases, the lateral offset bias cost for a candidate trajectory may be that assigned to the associated reference frame or segment. In examples where the reference frames are not the same as the segments of the reference trajectory used to assign lateral offset biases, the lateral offset bias costs for the candidate trajectory may be determined from the lateral offset bias costs of the segments of the reference trajectory used to assign lateral offset biases bridged by the associated reference trajectory frame. In at least some examples, the lateral offset bias used in a cost function to determine the trajectory based on the reference may be a combination of a lateral offset determined from a first segment and one or more subsequent segments (e.g., a weighted average based on segment length, a constantly varying offset which varies from the first offset to the second offset linearly or non-linearly from a center of the first segment to a center of a subsequent segment, or the like). Some implementations may smooth the transition between lateral offset biases for two adjacent segments by stepping the lateral offset bias from a first lateral offset bias of a current segment toward the second lateral offset bias of the next segment such that the lateral offset bias reaches the second lateral offset bias of the next segment a number of steps after entering the next segment (e.g., a midpoint between the biases is reached at the segment boundary and the steps continue until the second lateral offset bias is reached while traversing the next segment).

In some instances, the candidate trajectory can be perturbed, which can correspond to varying curvature values of one or more segments in the candidate trajectory, thereby generating a revised trajectory. In some instances, the candidate trajectory can be perturbed based at least in part on a gradient descent algorithm or a projected-Newton method. As can be understood, varying a curvature of a segment can change an intersection point on a reference line between the segment and the reference line. Revised costs can be determined for the revised candidate trajectory, and a candidate trajectory can be selected based at least on the determined costs. Thus, in this manner, the candidate trajectories can be perturbed and revised costs can be determined to output a candidate trajectory optimized for the various costs, as discussed herein.

In some instances, individual segments forming the candidate trajectory can represent segments having a constant curvature. Thus, for each segment, it can be assumed that inputs to a vehicle are not changed, such that an accurate trajectory of the vehicle motion can be determined. Further, because the segments can be determined, at least in part, using geometry, for example, the processing can be performed rapidly and can converge at an optimal solution, sometimes only requiring one or two iterations to determine an optimum.

In some instances, the decision planner component of the autonomous vehicle can consider multiple actions that the autonomous vehicle can perform. In an example where the autonomous vehicle is driving in a center lane of a multi-lane road, example actions of the autonomous vehicle can include driving in the center lane, switching to a left lane, or switching to a right lane. For each action (e.g., driving in the center, left, or right), the planner component can determine a candidate trajectory. The candidate trajectories can be included as instances of a search tree, and processing can include selecting an action based at least in part on costs associated with the individual action. In some instances, selecting an action can be based at least in part on simulating the vehicle dynamics with respect to each candidate trajectory. Thus, the operations discussed herein can facilitate selecting individual actions, as well as selecting individual trajectories from a plurality of trajectories (e.g., corresponding to the same action).

In some instances, temporal logic can be used to determine a validity of one or more of the candidate trajectories. For example, in some instances, a planner component of an autonomous vehicle can determine temporal logic formulas (e.g., linear temporal logic, signal temporal logic, etc.) based on static symbols and dynamic symbols representing various objects in an environment. The candidate trajectory can be evaluated with respect to the temporal logic formulas to determine if the trajectory is "valid" based on the symbols present in an environment (e.g., a stop sign) and the behavior of the vehicle represented by the candidate trajectory (e.g., stopping or not stopping at the stop sign). Additional details of utilizing temporal logic for a decision planner are discussed in a related application with Ser. No. 15/732,247, the entirety of which is herein incorporated by reference.

The trajectory generation techniques described herein can improve a functioning of a computing device by providing a robust mechanism for determining a trajectory using a lateral offset bias. For example, in some instances, the techniques used herein may implement a lateral offset bias to address a lateral tracking error. The lateral offset bias may cause or bias the trajectory the autonomous vehicle travels to deviate from the reference trajectory toward the inside of curves in the road. For example, a trajectory that deviates from the center of the road toward an inside of a curve may allow for increased speed of travel without reducing safety due to lateral tracking errors. Further, in some instances, the techniques used herein can provide a closed-form evolution of vehicle dynamics based at least in part on a reference trajectory and a relative coordinate transformation. In some instances, a candidate trajectory can be initialized using a straight-line segment or a curvature associated with a corresponding frame of the reference trajectory for efficient convergence to an optimal candidate trajectory. Moreover, in some instances, a planner component can explore various trajectories and/or actions in parallel, leading towards optimal outcomes in terms of autonomous vehicle control. In some instances, the trajectory generation discussed herein can be performed more accurately, may require less processing power, and/or may require less memory than conventional trajectory generation techniques, such as constrained nonlinear programming methods or an approximate linear system. These and other improvements to the functioning of the computer are discussed herein.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems using route planning and/or trajectory generation, and is not limited to autonomous vehicles. In another example, the methods, apparatuses, and systems may be utilized in an aviation or nautical context. Additionally, the techniques described herein may be used with real data (e.g., captured using sensor(s)), simulated data (e.g., generated by a simulator), or any combination of the two.

FIG. 1 depicts an example scenario 100 of providing a lateral offset bias with respect to a reference trajectory, as discussed herein.

As illustrated, an autonomous vehicle 102 is traversing a curve in a lane of travel 104. The reference trajectory 106 is the center of the lane. As shown, when an autonomous vehicle is cornering, the lateral tracking error (e.g., the deviation from the intended trajectory) may not have a zero mean distribution because, for example, an error which causes the autonomous vehicle to drift toward traveling straight (e.g., decrease a cornering rate) may occur more "easily" than an error which causes the autonomous vehicle to drift toward an inside of the turn (e.g., increase a cornering rate). This is illustrated by the lateral offset 112 of the uncompensated probability distribution 110 from the desired probability distribution 108.

Some examples herein may implement a lateral offset bias 114 to address the lateral offset 112. A lateral offset bias 114 may cause or bias the candidate trajectory the autonomous vehicle 102 travels to deviate from the reference trajectory 106 toward the inside of curve in the road (e.g., toward a left side of a road when the road curves left and toward a right side of a road when the road curves right).

The magnitude of the lateral offset bias 114 (also referred to as offset distance) provided may be determined based on the lateral offset of the uncompensated probability distribution 110 from the desired probability distribution 108 or the reference trajectory 106. As mentioned above, when an autonomous vehicle is cornering, the lateral tracking error (e.g., the deviation from the intended trajectory) may not have a zero mean distribution because, for example, an error which causes the autonomous vehicle to drift toward traveling straight may occur more "easily" than an error which causes the autonomous vehicle to increase a cornering rate. The lateral offset bias 114 discussed above may be determined to shift the center of the probability distribution to the center of the lane of travel 104.

Figure 2:
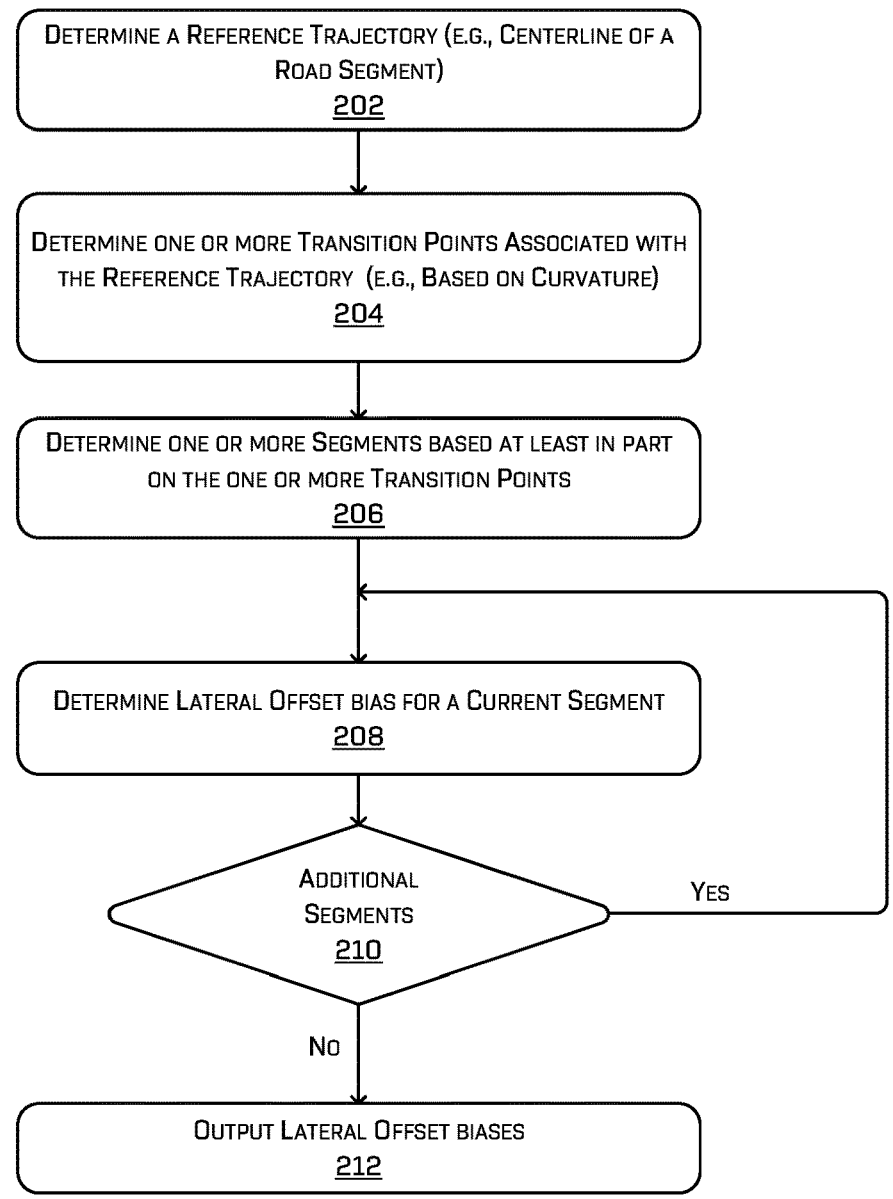
FIG. 2 depicts an example process for determining lateral offset biases with respect to a reference trajectory, in accordance with examples of the disclosure.

FIG. 2 depicts an example process for determining a lateral offset bias with respect to a reference trajectory, as discussed herein. For example, some or all of the process 200 can be performed by one or more components of an autonomous vehicle, as described herein. For example, some or all of the process 200 can be performed by a planning component of an autonomous vehicle. For example, some or all of the process 200 can be performed by a reference trajectory component, a decision planner component, a trajectory tracker component, and/or an execution component.

At operation 202, the process can include determining or receiving a reference trajectory. In some instances, the reference trajectory can correspond to a centerline of a lane of a road segment, for example, or any drivable surface. In some instances, the reference trajectory can be generated by the route planner component and provided to the decision planner component or can be generated by the decision planner component based at least in part on waypoints (or other information) provided by a route planner component.

At operation 204, the process can include determining one or more transition points associated with the reference trajectory. For example, the operation 204 can include determining a curvature value associated with each point of the reference trajectory. The operation 204 can include grouping points of the reference trajectory together based on a similarity of sign of the curvature (e.g., positive or negative) associated with the reference trajectory. In some instances, a transition point of the one or more transition points can be associated with a point on the reference trajectory where the sign of the curvature changes from a positive value to a negative value, or vice versa and/or where a change in the magnitude of curvature from a prior transition point exceeds a threshold. In some instances, a positive value can correspond to a "right turn", while in some cases a positive value can correspond to a "left turn" of reference trajectory, although any frame of reference can be used.

At operation 206, the process can include determining one or more segments based at least in part on the one or more transition points. In some instances, the operation 206 can include associating a segment identifier with various points of the reference trajectory. In some instances, the operation 206 can include verifying that the curvature is continuous between the segments and/or that a curvature of the segments does not have a curvature value that is higher than a maximum curvature value based on velocity, a coefficient of friction of a road surface, within a threshold amount of a curvature associated with a previous segment, and/or other geometric constraints (e.g., it may be impossible to connect two segments having a difference in curvature larger than some threshold).

At operation 208, the process can include determining a lateral offset bias for a current segment (e.g., a first or an unprocessed segment of the reference trajectory). As mentioned above, the form of the lateral offset bias may vary depending on the implementation. In some examples, the lateral offset bias may be assigned as a cost value that may bias or lower the cost for candidate trajectories determined for the segment which are toward the inside of a curve in the road or segment (e.g., toward a left side of a road or segment when the road or segment curves left and toward a right side of a road or segment when the road or segment curves right). In some examples, the lateral offset bias may be assigned by shifting the reference trajectory from the center of a lane of the segment or loading a biased reference trajectory for the segment from a plurality of reference trajectories.

The amount of lateral offset bias may vary depending on the speed of travel and/or lateral acceleration that will be experienced in a curve. For example, implementations utilizing a cost function to implement lateral offset bias may determine a lateral offset from the reference trajectory that has a lowest cost based on the speed of travel and/or lateral acceleration that will be experienced in a curve. Such a determination may be performed by, for example, a look up table or by calculations performed in real time. An example look up table that may be queried based on the speed of travel and lateral acceleration that will be experienced in a curve is shown below.

| $V_x$ $A_y$ | 10 kph | 40 kph | 80 kph | 120 kph |
|---|---|---|---|---|
| 1 m/s² | 0.11 m | 0.11 m | 0.32 m | 0.49 m |
| 2 m/s² | N/A | 0.15 m | 0.34 m | 0.30 m |
| 3 m/s² | N/A | 0.40 m | 0.98 m | 1.07 m |

As shown above, where the autonomous vehicle is traveling at 40 kph and traversing a curve in which the lateral acceleration experienced is 2 m/s', the lateral offset bias may be provided by a cost function that has a lowest cost 0.15 m toward the inside of the curve from the default reference line. Similarly, where the autonomous vehicle is traveling at 80 kph and traversing a curve in which the lateral acceleration experienced is 3 m/s², the lateral offset bias may be provided by a cost function that has a lowest cost 1.07 m toward the inside of the curve from the default reference line. In at least some examples, the table may be minimized based on using the same values, but negated for negative lateral accelerations.

Implementations that offset the reference trajectory to implement lateral offset bias may utilize the speed of travel and/or lateral acceleration to shift the reference trajectory from the center of road or may load a biased reference trajectory from a plurality of reference trajectories associated with speeds of travel and/or lateral accelerations. Referring to the table above, where the autonomous vehicle is traveling at 40 kph and traversing a curve in which the lateral acceleration experienced is 2 m/s', the process 200 may shift the reference trajectory 0.15 m toward an inside of the curve (or otherwise select a reference trajectory 0.15 m towards the inside of the curve relative to an original reference trajectory).

Whether provided as a cost or by shifting the reference trajectory, the magnitude of the lateral offset bias provided by look up table or by real time calculation may be determined based on the probability distribution of lateral tracking errors. As mentioned above, when an autonomous vehicle is cornering, the lateral tracking error (e.g., the deviation from the intended trajectory) may not have a zero mean distribution because, for example, an error which causes the autonomous vehicle to drift toward traveling straight may occur more "easily" than an error which causes the autonomous vehicle to increase a cornering rate. The compensations discussed above may be determined to shift the center of the probability distribution to the center of the lane of travel. For example, for a given speed of travel, road segment curvature and/or lateral acceleration that will be experienced by an autonomous vehicle while traversing a curve, techniques according to this disclosure may determine that the centers of the probability distribution of lateral tracking errors is, for example, three inches from the center of the lane in the outward direction. As such, techniques herein may provide a lateral offset bias of three inches from the center toward the inside of the lane. However, this is merely an example and implementations are not limited to a lateral offset bias that centers the distribution to the center of the lane of travel. Depending on the implementation, other factors, such as the standard deviation and/or skewness of the probability distribution, may also be considered such that the lateral offset bias may be less or more than the difference between the center of the lane of travel and the center of the probability distribution.

At operation 210, the process 200 may include determining if additional segments remain which have yet to be assigned a lateral offset bias. If so, the process 200 may return to operation 208. Otherwise, the process 200 may continue to 212.

At operation 212, the process 200 may include outputting the lateral offset biases for the segments. For example, the process 200 may output the lateral offset biases as a set of lateral offsets mapped to segments of the reference trajectory.

Figure 3:
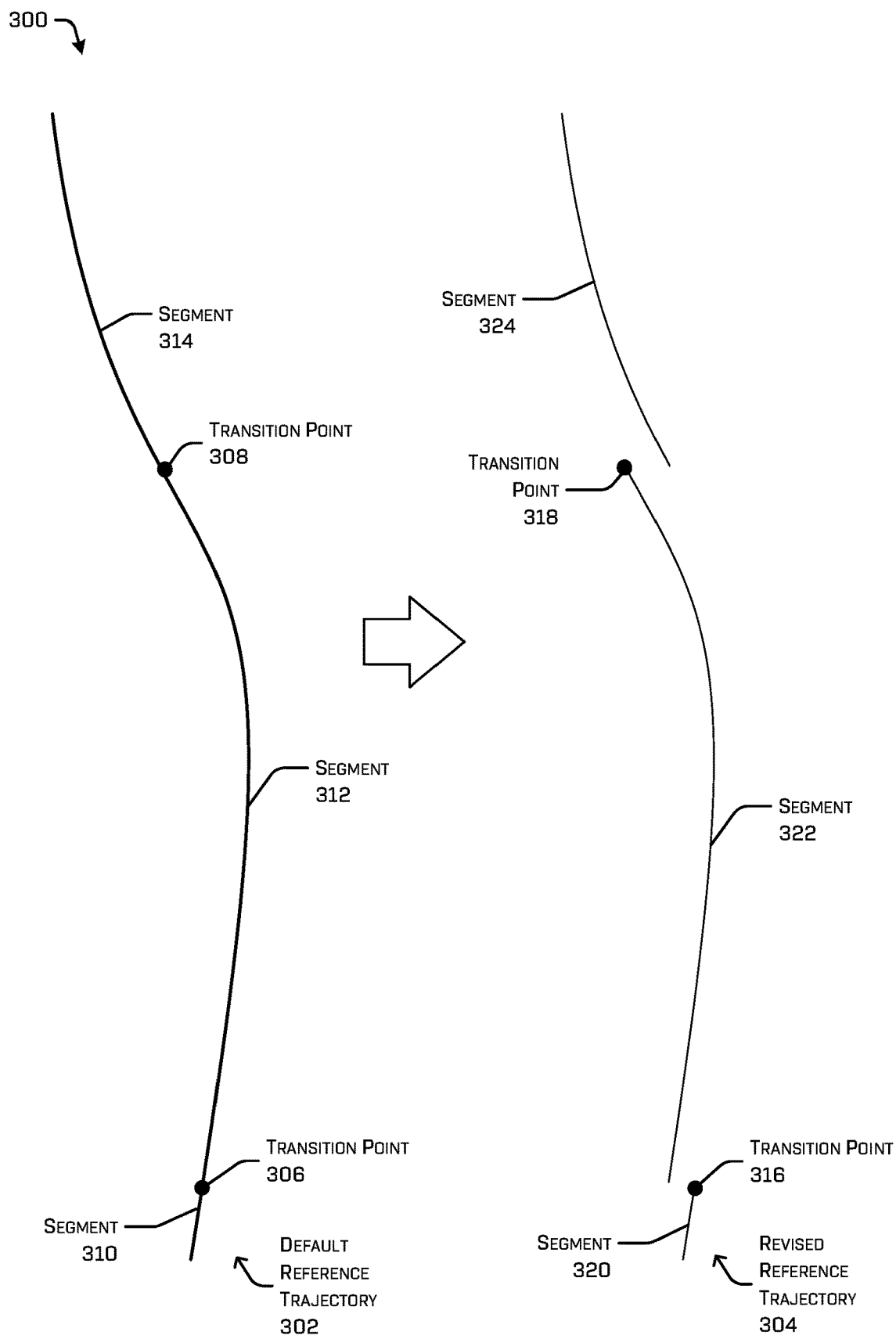
FIG. 3 depicts an example revised reference trajectory including lateral offset biases determined from a default reference trajectory, in accordance with examples of the disclosure.

FIG. 3 depicts an example diagram 300 including a revised reference trajectory including lateral offset biases determined from a default reference trajectory, in accordance with examples of the disclosure. More particularly, a default reference trajectory 302 may be processed to generate a revised reference trajectory 304 which includes lateral offset biases.

As illustrated in FIG. 3 and discussed above with respect to process 200, in operation, the default reference trajectory 302 may be analyzed to determine transition points. In the illustrated example, transition points may be assigned at locations where the curvature changes sign. In the example shown in FIG. 3, the curvature becomes negative (e.g., turns left) before later becoming positive (e.g., turning right). More particularly, a transition point 306 may be assigned where the curvature becomes negative and a transition point 308 may be assigned where the curvature comes positive again.

Based on the transition points, the default reference trajectory 302 may be divided into segments. More particularly, the default reference trajectory 302 may be divided into a segment 310 prior to transition point 306, a segment 312 between transition points 306 and 308 and a segment 314 after transition point 308.

Lateral offset biases may then be determined for segments 310-314. FIG. 3 illustrates the lateral offset biases as taking the form of revised reference trajectory 304 which includes shifted segments. However, this form was chosen for ease of illustration and other forms, such as cost functions may be provided in a similar manner.

As mentioned above, the magnitude of the shift for each segment may be determined based on the speed of travel of the autonomous vehicle and a lateral acceleration that will be experienced in traversing the segment. As shown, the revised reference trajectory 304 includes transition points 316 and 318 (e.g., which may correspond to transition points 306 and 308) which demark the beginning and end of segments 320, 322, and 324 (e.g., which may correspond to segments 310, 312, and 314). As illustrated, segment 320 has not been shifted from segment 310 of the default reference trajectory 302, segment 322 has been shifted from segment 312 toward the inside of its curve (e.g., left) and segment 324 has been shifted from segment 314 toward the inside of its curve (e.g., right).

In an example providing lateral offset bias as a cost function instead of or in addition to shifting the reference trajectory, each segment may instead be assigned a cost function or a parameter for a cost function that has a lowest cost for a candidate trajectory associated with the segment when the candidate trajectory is laterally offset toward the inside of the curve by the determined distance. An example candidate trajectory is illustrated in FIG. 4.

Figure 4:
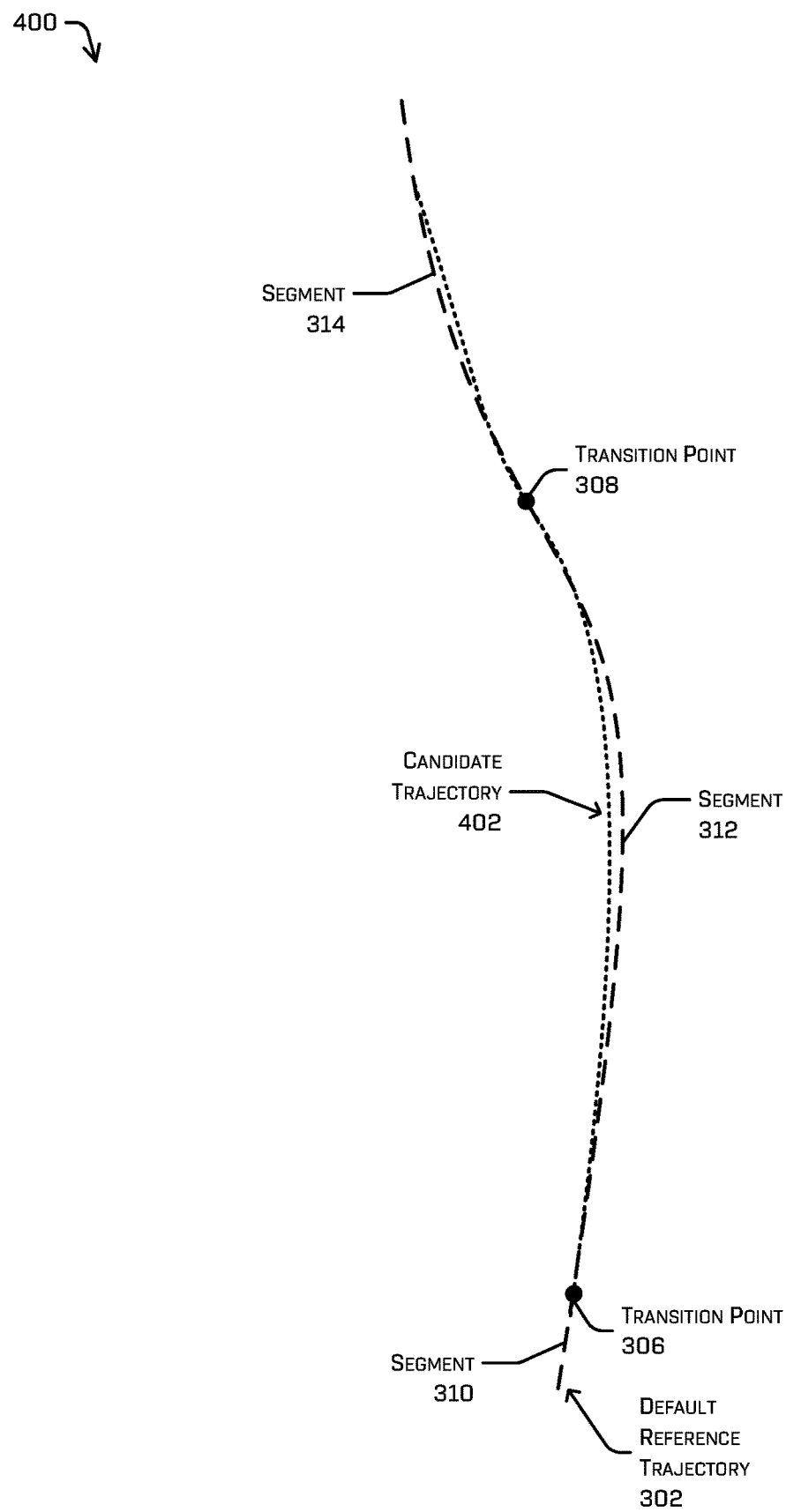
FIG. 4 depicts an example candidate trajectory determined from a default reference trajectory using lateral offset biases, in accordance with examples of the disclosure.

FIG. 4 depicts an example diagram 400 including an example candidate trajectory determined from a reference trajectory using lateral offset biases, in accordance with examples of the disclosure. As shown, the candidate trajectory 402 may be determined based on the default reference trajectory 302 and lateral offset biases in the form of cost functions assigned to segments 310, 312 and 314 (e.g., without other costs influencing the candidate trajectory determination).

As illustrated, as the candidate trajectory 402 passes the transition point 306, the candidate trajectory 402 progressively shifts toward the inside of the curve of segment 312 due to the cost function that provides the lateral offset bias for segment 312. Similarly, as the candidate trajectory 402 approaches and passes the transition point 308, the candidate trajectory 402 progressively shifts back to the default reference trajectory 302 and then toward the inside of the curve of segment 314 due to the cost function that provides the lateral offset bias for segment 314. Then, the candidate trajectory 402 progressively shifts back to the default reference trajectory 302 as the candidate trajectory 402 approaches the end of segment 314.

FIGS. 5-11 provide additional details for determining candidate trajectories based on reference trajectories to provide lateral offset biases and compensation for other factors. Throughout the discussion of FIGS. 5-11, reference trajectories utilized in determinations of candidate trajectories may be revised or shifted as discussed above and/or cost functions utilized in determining candidate trajectories may include cost functions providing lateral offset biases as discussed above.

Figure 5:
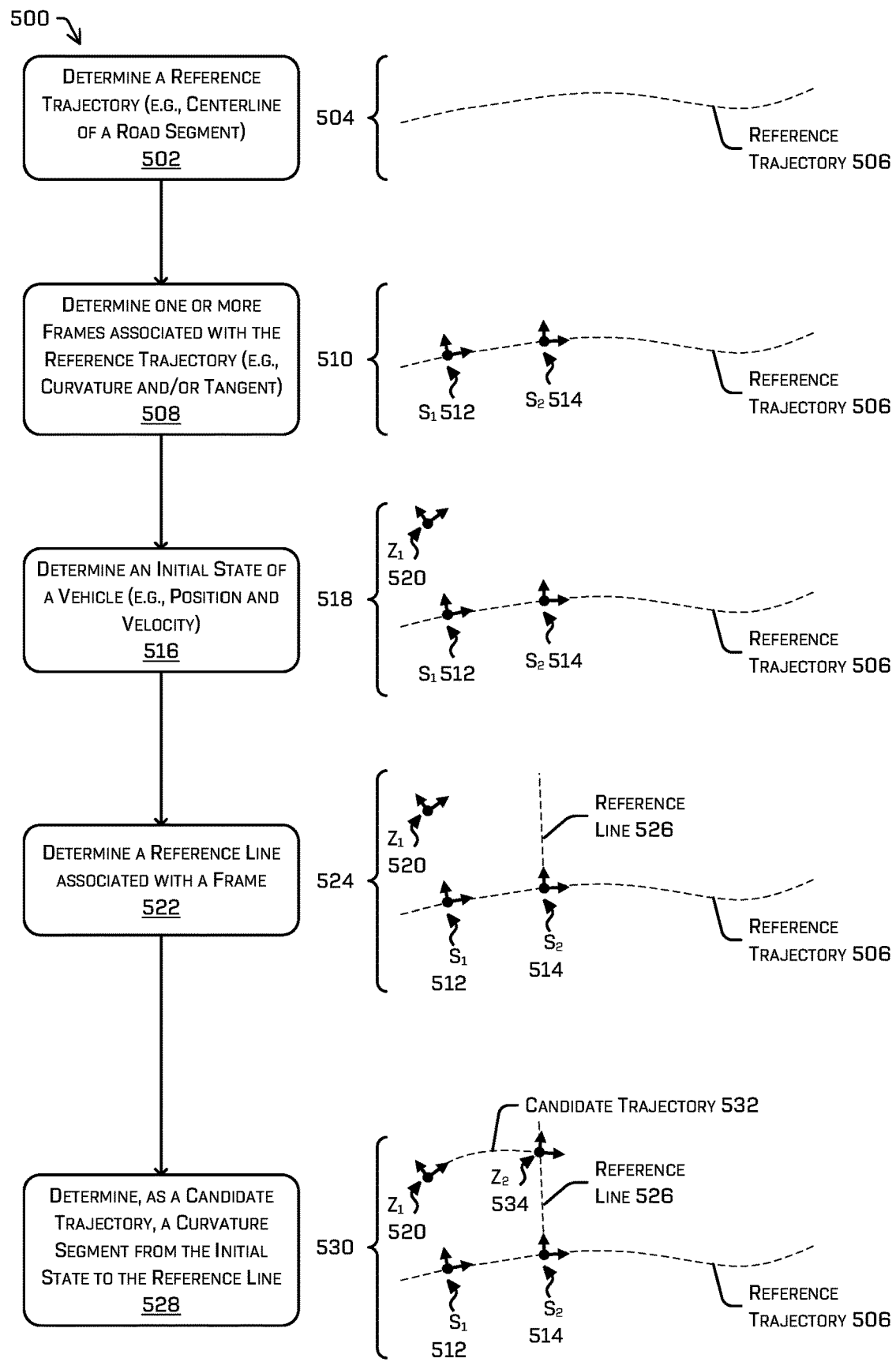
FIG. 5 illustrates a pictorial flow diagram of an example process for determining a candidate trajectory for an autonomous vehicle based on curvature segments and frames associated with a reference trajectory, in accordance with examples of the disclosure.

FIG. 5 illustrates a pictorial flow diagram 500 of an example process for determining a candidate trajectory for an autonomous vehicle based on curvature segments and frames associated with a reference trajectory, in accordance with examples of the disclosure.

At operation 502, the process can include determining a reference trajectory 506 for an autonomous vehicle to follow (e.g., traverse) in an environment. In some instances, the reference trajectory 506 can correspond to a centerline of a road segment. The reference trajectory 506 can be generated by a decision planner component (discussed below in connection with FIG. 9) at least partially in response to high-level mission requirements associated with a route, such as instructions for a vehicle to navigate to from point A to point B. As illustrated in an example 504, a reference trajectory 506 can correspond to any shape or path navigable by a vehicle.

At operation 508, the process can include determining one or more frames associated with the reference trajectory. In some examples, frames may correspond to the above discussed segments of the reference trajectory used to assign lateral offset biases. More particularly, frames may be segmented where a sign of the curvature changes from a positive value to a negative value, or vice versa and/or where a change in the magnitude of curvature from a beginning of the frame exceeds a threshold. Additionally or alternatively, frames may be divided by equally-spaced points on the reference trajectory (e.g., where segments of the reference trajectory used to assign lateral offset biases are longer than a desired length for frames). In some instances, the one or more frames can be determined at fixed intervals of distance with respect to the reference trajectory. In some instances, the one or more frames can be determined at fixed time intervals based on a velocity of the autonomous vehicle. In some instances, individual frames of the reference trajectory 506 can include information defining at least a portion of the reference trajectory, such as a curvature value and/or a tangent vector of a point on the reference trajectory. In an example 510, the reference trajectory 506 is illustrated with a first frame $S_1$ 512 and a second frame $S_2$ 514. In some instances, the reference trajectory 506 can include any number of frames, and in some instances, a number of frames can be based at least in part on a distance of a receding horizon and a distance between frames within the receding horizon. For example, the receding horizon may be on the order of 50 meters and individual frames can be spaced on the order of every 25 centimeters, although any distances are contemplated herein. In some examples, the receding horizon may be based on a period of time for a vehicle to travel. In some instances, frames can be spaced at any regular or irregular intervals of time, space, curvature, etc.

The first frame 512 and the second frame 514 can provide a representation of the reference trajectory 506 at points along the reference trajectory 506. For example, the first frame 512 can include a curvature value of the reference trajectory 506 at a portion before the first frame 512, at a discrete point representing the first frame 512, and/or a portion following the first frame 512 (e.g., between the first frame 512 and the second frame 514). Further, the first frame 512 can include a representation of a tangent vector corresponding to a point on the reference trajectory 506. In some instances, the first frame 512 can include information associated with a road surface, such as surface material (e.g., gravel, asphalt, concrete, metal), coefficient of friction, a measure of surface irregularities (e.g., potholes, etc.), temperature, weather conditions, speed limits, and the like. As can be understood, the second frame 514 can be associated with a curvature value and tangent vector associated with a second point on the reference trajectory 506, as well as any additional information, as discussed herein.

The operation 516 can include determining an initial state of a vehicle, such as an autonomous vehicle. In some instances, the initial state of the vehicle can include, but is not limited to, a position of the vehicle (e.g., in a coordinate system relative to the reference trajectory 506, etc.), a velocity of the vehicle, and the like. In an example 518, an initial state $Z_1$ 520 represents a location of the autonomous vehicle, for example, at an instant corresponding to the first frame 512. That is, the initial state 520 can correspond to the first frame 512, such that the first frame 512 represents where the vehicle ideally should be, while the initial state 520 represents where the vehicle actually is at a time or location associated with the first frame 512.

The initial state 520 can further include information such as, but not limited to, a steering angle, a steering angle rate of change, a direction of the vehicle (e.g., a yaw angle), a yaw rate, resources of the vehicle (e.g., fuel (gasoline, diesel, etc.) or energy (e.g., electrical energy, battery level, etc.), occupancy (e.g., passengers, cargo, etc.), mechanical state (e.g., odometer value, turning restrictions, suspension status, and the like), passenger preferences (e.g., preference for a smooth ride, preference for a fast ride, etc.), and the like. In some instances, aspects of the initial state 520 can be determined by a localization component of the autonomous vehicle.

At operation 522, the process can include determining a reference line associated with a frame. As shown in an example 524, a reference line 526 can extend from the reference trajectory 506 in a direction that is substantially perpendicular to the tangent vector associated with the second frame 514. In some instances, a direction of the reference line 526 may vary, and need not be constrained by or be associated with the tangent vector of the second frame 514.

At operation 528, the process can include determining, as a candidate trajectory, a curvature segment from the initial state to the reference line. In an example 530, a candidate trajectory 532 is shown originating at the initial state 520 and intersecting with the reference line 526 at an intersection point that corresponds to a second state 534. As can be understood, a location of the intersection point (and accordingly, a location of the second state 534) can be based at least in part on a curvature value associated with the candidate trajectory 532. For example, various curvature values may result in a candidate trajectory with an intersection point on the reference line 526 that is higher or lower that the intersection point as illustrated in FIG. 5.

In some instances, a curvature value for a curvature segment can be initialized based at least in part on a curvature value of the associated frame. For example, for the curvature segment corresponding to the candidate trajectory 532, the curvature value can correspond to the curvature value associated with the first frame 512. In some instances, a curvature value can be initialized as a straight-line segment. In some instances, a curvature value can be bounded or constrained to ensure that a curvature segment with an origin corresponding to the initial state 520 intersects with the reference line 526 (instead of spiraling away from the reference line 526 without ever intersecting with the reference line 526). In some instances, the curvature value can be based at least in part on curvature value(s) associated with adjacent frames (e.g., an average or weighted average of curvature values over a sliding window), thereby enforcing continuity.

As mentioned above, the candidate trajectory 532 can comprise a plurality of curvature segments associated with a plurality of frames. Further, as the candidate trajectory is extended from left to right (as illustrated in FIG. 5), an intersection point for a curvature segment becomes an origin point for a next segment, as discussed herein. In such a manner, the candidate trajectory 532 may be extended (or evolved in time) up to, for example, a receding horizon. As discussed in FIG. 6, and throughout this disclosure, one or more costs can be determined for a candidate trajectory. The curvature values can be varied (e.g., increased or decreased) to determine revised candidate trajectory, and revised costs can be determined based on the revised candidate trajectory.

Figure 6:
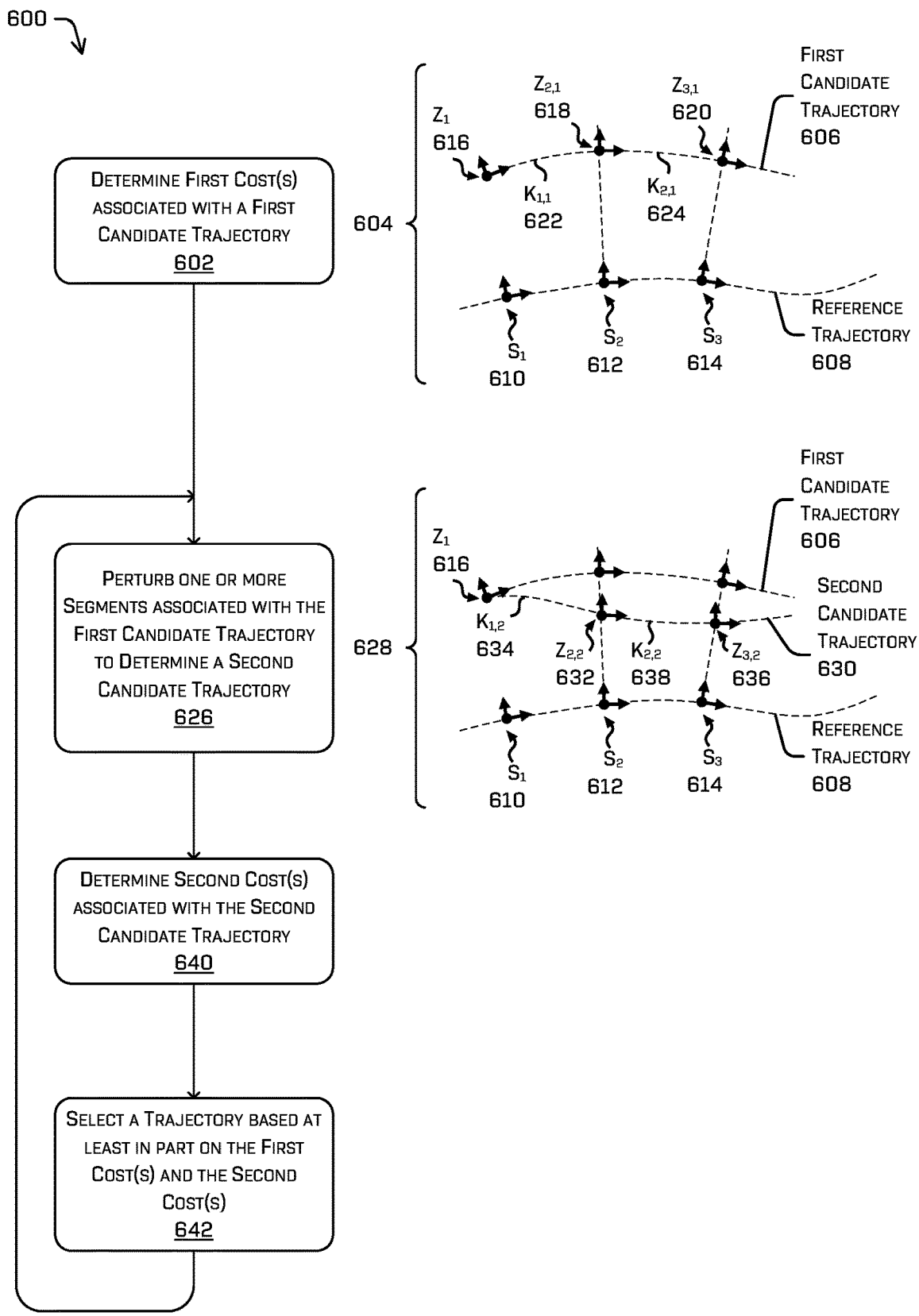
FIG. 6 illustrates a pictorial flow diagram of an example process for determining multiple candidate trajectories, determining costs associated with the multiple candidate trajectories, and selecting a trajectory, in accordance with examples of the disclosure.

FIG. 6 illustrates a pictorial flow diagram 600 of an example process for determining multiple candidate trajectories, determining costs associated with the multiple candidate trajectories, and selecting a trajectory, in accordance with examples of the disclosure.

At operation 602, the process can include determining first costs associated with a first candidate trajectory. In some instances, and without limitation, one or more costs associated with a candidate trajectory can be based at least in part on one or more of: a first distance from the autonomous vehicle to a corresponding frame on the reference trajectory; a second distance between the autonomous vehicle and an obstacle (or a pedestrian or another vehicle); an acceleration of the autonomous vehicle; a steering rate of change of the autonomous vehicle; a length of the candidate trajectory with respect to a length of the reference trajectory; comfort; performance; power consumption; a safety metric; obeying the rules of the road; or the like.

In examples providing a lateral offset bias through cost functions, the costs for the candidate trajectory may also include the lateral offset bias cost. In examples where the reference trajectory frames are the same as the segments of the reference trajectory used to assign lateral offset biases discussed in FIGS. 2-4, the lateral offset bias cost for a candidate trajectory may be that assigned to the associated reference frame or segment. In examples where the reference frames are not the same as the segments of the reference trajectory used to assign lateral offset biases, the lateral offset bias costs for the candidate trajectory may be determined from the lateral offset bias costs of the segments of the reference trajectory used to assign lateral offset biases bridged by the associated reference trajectory frame.

In some examples, the one or more costs can be determined simultaneously for a candidate trajectory comprising a plurality of segments and can represent a summation or integration of some or all costs associated with the candidate trajectory.

An example 604 illustrates a first candidate trajectory 606 associated with a reference trajectory 608. In some instances, individual segments of the first candidate trajectory 606 can be generated using a process similar to that discussed above in connection with FIG. 5. As illustrated, the reference trajectory 608 includes frames 610, 612, and 614 (labeled as $S_1$, $S_2$, and $S_3$, respectively). An initial position 616 of a vehicle (e.g., an autonomous vehicle) is labeled as $Z_1$ (also referred to as a first state). The first candidate trajectory 606 further includes a second state 618 (e.g., $Z_{2,1}$ corresponding to the second state of the first candidate trajectory) and a third state 620 ($Z_{3,1}$). A first segment of the first candidate trajectory 606 between the first state (e.g., 616) and the second state (e.g., 618) can be associated with a curvature value $K_{1,1}$ 622, while a second segment between the second state 618 and the third state 620 can be associated with a curvature value $K_{2,1}$ 624.

As illustrated in the example 604, each segment of the first candidate trajectory 606 can be based at least in part on the preceding segments, for example. That is, a first segment can be defined by the initial position 616 of the vehicle and an intersection point (e.g., the second state $Z_{2,1}$ 618) with a reference line associated with the second frame 612, whereby the intersection point is based at least in part on the curvature value $K_{1,1}$ 622. The second segment can then be defined by the second state 618 and an intersection point (e.g., the third state 620) with a reference line associated with the third frame 614. Thus, the segments can build upon on one another to generate the first candidate trajectory 606. Of course, it can be understood that a trajectory can be generated from an origin to a destination (e.g., as illustrated in FIG. 5) or from a destination to an origin, or a combination of the two. Further, a segment for a candidate trajectory can be defined relative to an obstacle or other point, for example, without constraint to either end of the candidate trajectory.

At operation 626, the process can include perturbing one or more segments associated with the first candidate trajectory to determine a second candidate trajectory. In some instances, perturbing the candidate trajectory can be based at least in part on projected-Newton method (e.g., a projected stage-wise Newton method with nonlinear vehicle dynamics updated during a forward pass), a gradient descent algorithm, etc. In an example 628, a second candidate trajectory 630 is illustrated as representing a different trajectory from the first candidate trajectory 606. The second candidate trajectory 630 can be associated with the initial position (or first state) 616, but can include different curvature values, thereby establish a new trajectory. For example, a first segment of the second candidate trajectory 630 between the first state (e.g., 616) and a second state (e.g., $Z_{2,2}$ 632) can be associated with a curvature value $K_{1,2}$ 634, while a second segment of the second candidate trajectory 630 between the second state 632 and a third state (e.g., $Z_{3,2}$ 636) can be associated with a curvature value $K_{2,2}$ 638.

As can be understood, perturbing at least one curvature value (e.g., to ensure that a distance between an obstacle and the vehicle is at or above a minimum value) can cause a cascading effect to ripple through the second trajectory 630, thereby causing one or more additional variations in other curvature values for other segments.

At operation 640, the process can include determining second costs associated with the second candidate trajectory. In some instances, and without limitation, the one or more second costs associated with the second candidate trajectory 630 can be based at least in part on one or more of: a first distance from the autonomous vehicle to a corresponding frame on the reference trajectory 608; a second distance between the autonomous vehicle and an obstacle; an acceleration of the autonomous vehicle; a steering rate of change of the autonomous vehicle; a length of the candidate trajectory with respect to a length of the reference trajectory; comfort; performance; power consumption; a safety metric; obeying the rules of the road; or the like. In examples providing a lateral offset bias through cost functions, the second costs for the second candidate trajectory may also include the lateral offset bias cost as discussed above.

In some examples, the one or more second costs can be determined simultaneously for a candidate trajectory comprising a plurality of segments and can represent a summation or integration of some or all costs associated with the second candidate trajectory 630.

At operation 642, the process can include selecting a trajectory based at least in part on the first costs and the second costs. In some examples, the operation 642 can include selecting a trajectory with the lowest costs. In some example, the operation 642 can include determining that the first and second costs are above a threshold value (e.g., indicating that the first and second candidate trajectories are not sufficiently optimized) and that a third candidate trajectory can be determined (illustrated by the iterative processing from the operation 642 to the operation 626). In some instances, the operation 642 can include simulating a selected trajectory with a more detailed model to confirm the costs determined in the operations, and in some instances, the operation 642 can include outputting the selected trajectory to a vehicle controller to control the operations of the autonomous vehicle.

Figure 7:
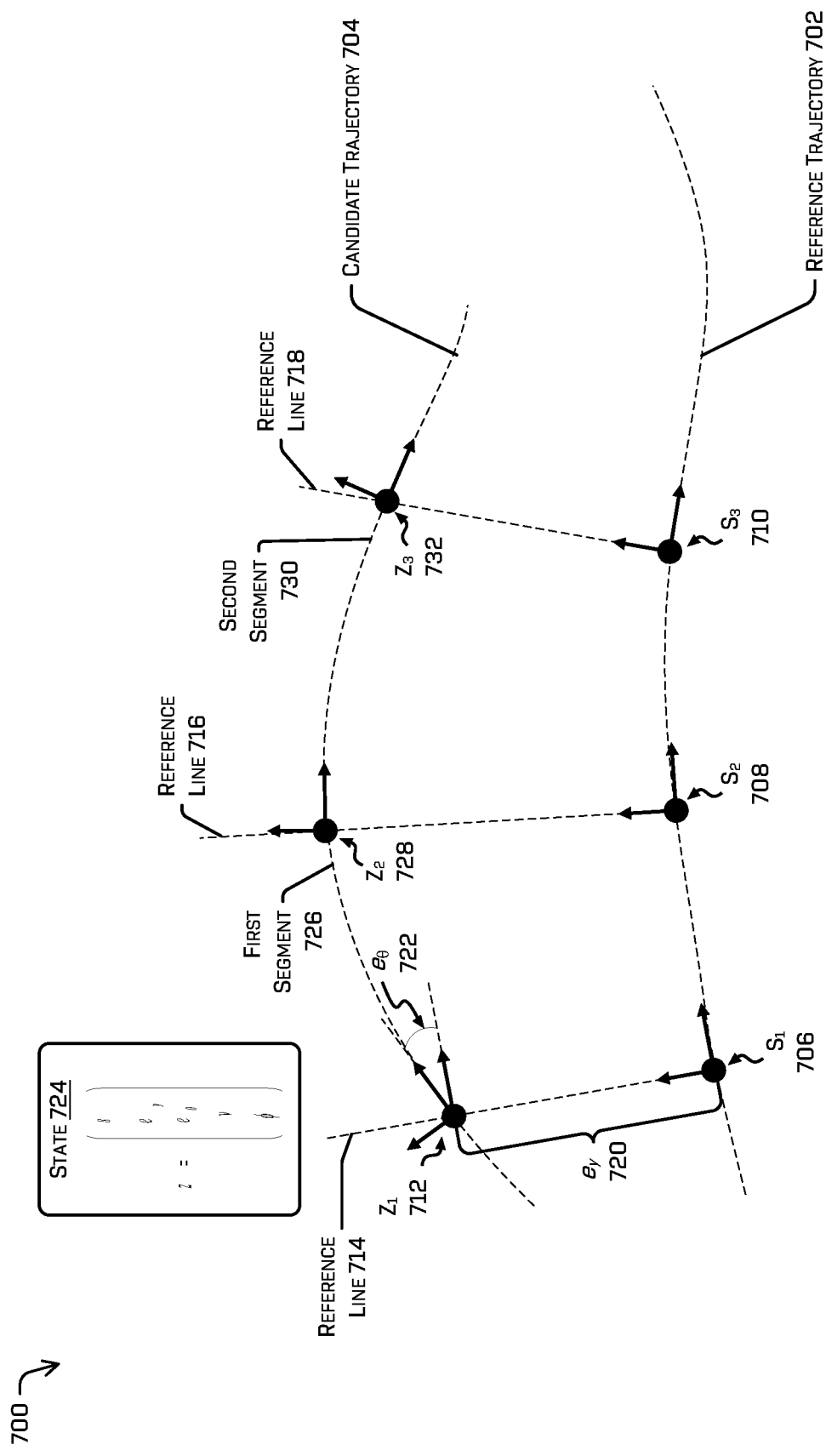
FIG. 7 depicts an example candidate trajectory including state information associated with an autonomous vehicle, in accordance with examples of the disclosure.

FIG. 7 depicts an example diagram 700 of a candidate trajectory including state information associated with an autonomous vehicle, in accordance with examples of the disclosure. As discussed above, a reference trajectory 702 may be provided to or generated by a decision planner component of an autonomous vehicle representing a default path for the autonomous vehicle to follow in an environment. Further, as discussed above, a candidate trajectory 704 can be generated based on the reference trajectory 702, whereby the candidate trajectory 704 can represent an actual path (or closer to the actual path) for the autonomous vehicle to follow.

As can be understood, a vehicle can be modeled in any level of abstraction. As illustrated in the example diagram 700, the vehicle can be modeled as a point. In some instances, a model of the vehicle can include, but is not limited to, a rigid body dynamics model, a vehicle model based on actual vehicle characteristics (e.g., friction, acceleration, length/width, etc.), and/or a simplified model whereby a vehicle is represented as a "bicycle" (e.g., a vehicle with four wheels is simplified as a motorcycle or bicycle).

The reference trajectory 702 can be associated with one or more frames 706, 708, and 710 (labeled as $S_1$, $S_2$, and $S_3$, respectively). As discussed above, individual frames can include information representing the reference trajectory 702, including but not limited to a curvature value associated with a point or a segment of the reference trajectory 702 and a tangent vector associated with a point or a segment of the reference trajectory 702.

An initial position 712 of the vehicle can correspond to an intersection between a reference line 714 associated with the first frame 706 of the reference trajectory 702 and a motion of the vehicle. In some examples, the reference line 714 can correspond to a line that is substantially perpendicular to a vector (e.g., a normal vector) that is tangent to a point representative of the first frame 706. In some instances, the location of the intersection between a motion of the vehicle and the reference line 714 can correspond to the initial position 712. The reference trajectory 702 can further be associated with reference lines 716 and 718 corresponding to the second and third frames (e.g., 708 and 710), as can be understood herein.

A plurality of data can be associated with each state of the candidate trajectory 704. For example, the initial state 712 of the vehicle can include a lateral offset 720 (e.g., $e_y$) representing a distance along the reference line 714 between the initial state 712 and the first frame 706.

Further, the initial state 712 can include an angle offset 722 (e.g., $e_\theta$), which can be defined as an angle between a current direction of travel of the vehicle and a direction associated with the reference trajectory of the first frame 706.

Additional details of the initial state 712 can be represented as a state 724 (e.g., Z), whereby Z can be represented as:

$$Z = \begin{pmatrix} s \\ e_y \\ e_\theta \\ v \\ \phi \end{pmatrix} \quad (1)$$

where s identifies an arc length along the reference trajectory, which in turn can be used to identify a particular frame (e.g., the first frame 706, the second frame 708, the third frame 710 . . . ), $e_y$ represents a lateral offset of the vehicle from the reference trajectory 702 at a particular frame, $e_\theta$ represents an angle offset between a vector associated with the reference trajectory 702 (e.g., a tangent vector) and a vector associated with the vehicle, v represents a velocity of the vehicle associated with a particular frame, and $\phi$ represents a steering angle of the vehicle associated with the particular frame.

Inputs to a vehicle can be represented a U, whereby U can be represented as:

$$U = \begin{pmatrix} a \\ \bullet \\ \phi \end{pmatrix} \quad (2)$$

where a represents an acceleration of the vehicle, and $\dot{\phi}$ represents a steering angle rate of change.

A derivative of the state Z can be represented by the equation below:

$$\dot{Z} = f(Z, U, \text{reference}(K, T)) \quad (3)$$

where Z is a state, U are controls, and reference can correspond to an argument referring to the reference trajectory 702 and can include a curvature K and a tangent vector T associated with a particular frame.

Thus, a first segment 726 can be determined at least in part by the initial state 712, a curvature value K, and a tangent vector T associated with establishing the reference line 716. A second state 728 can be determined as the intersection between the first segment 726 and the reference line 716, whereby the intersection is based at least in part on a curvature value K. As can be understood, the second state 728 can correspond to an origin of a second segment 730, which can in turn intersect with the reference line 718 to define a third state 732.

Further, in some instances, dynamics of a vehicle can be represented by bicycle dynamics (e.g., the vehicle can be represented as a "bicycle" with two wheels and a length L, whereby bicycle dynamics can be represented as:

$$\dot{s} = \frac{v \cos e_\theta}{1 - k(s)e_y} \quad (4)$$

$$\dot{e}_y = v \sin e_\theta \quad (5)$$

$$\dot{e}_\theta = v\left(\frac{\tan \varphi}{L} - k(s)\dot{s}\right) = v\left(\frac{\tan \varphi}{L} - \frac{k(s) \cos e_\theta}{1 - k(s)e_y}\right) \quad (6)$$

$$\dot{v} = a \quad (7)$$

where a can represent acceleration, k(s) can represent a curvature of the reference trajectory at a point s, L can represent a length of the vehicle.

In some instances, a trajectory can be represented as piecewise geometry segments having a curvature that is linear in a segment (e.g., corresponding to s), which is to say that each segment can be a clothoid curve. In some instances, a curvature of an i-th segment along the reference trajectory can be parameterized as:

$$k_i(s) = k_{i0} + k_{i1}s \quad (8)$$

As discussed above, a plurality of data can be associated with each state. Thus, each of the states 712, 728, and 732 can be associated with state information similar to the state 724.

Figure 8:
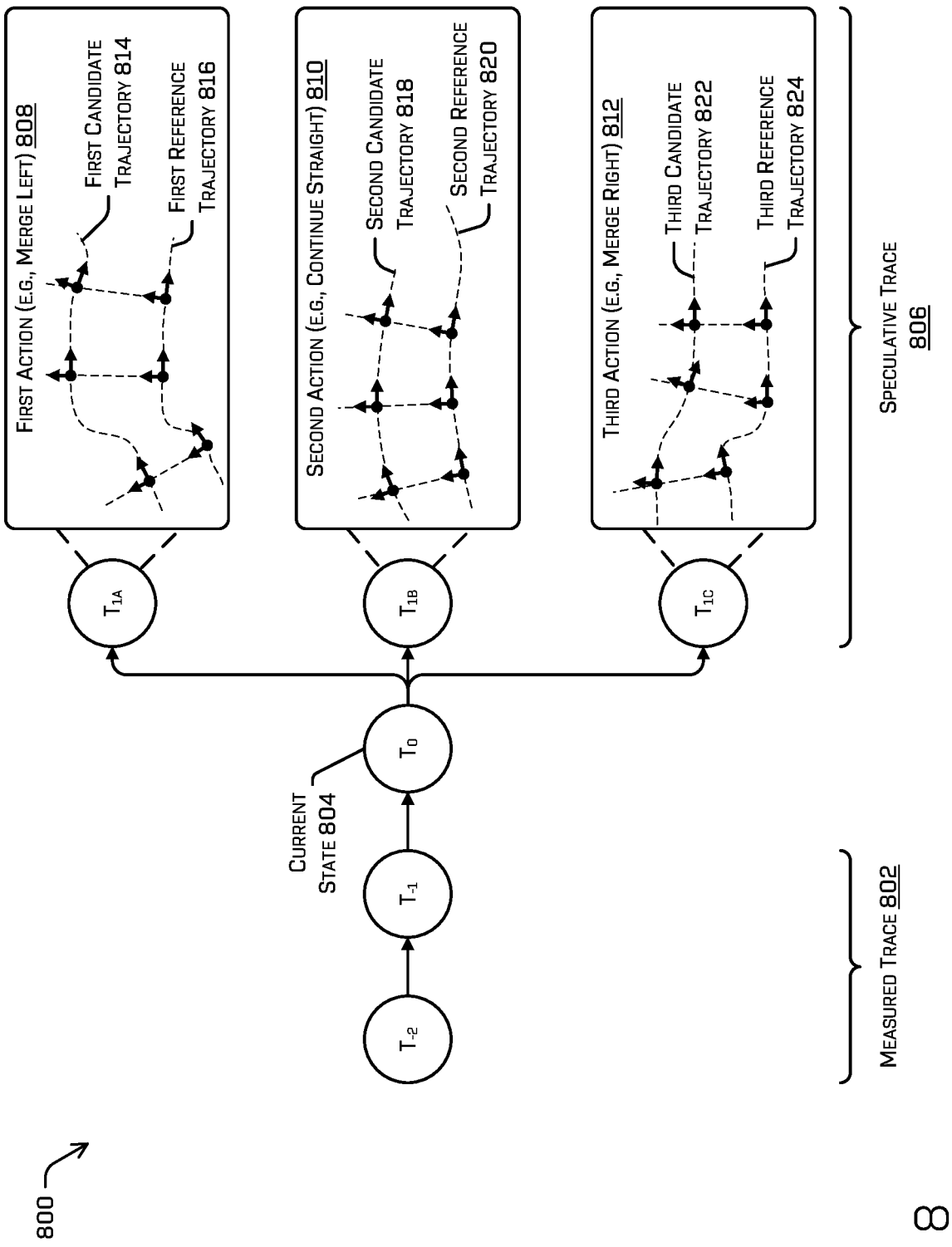
FIG. 8 depicts an example search tree for evaluating candidate trajectories associated with various actions, in accordance with examples of the disclosure.

FIG. 8 depicts an example search tree 800 for evaluating candidate trajectories associated with various actions, in accordance with examples of the disclosure. In some instances, the search tree 800 can be associated with a measured trace 802, which can store observations about the environment over time, such as the presence of symbols in an environment, states of an autonomous vehicle (e.g., velocity, steering angle, acceleration, etc.). Further, the search tree 800 can be associated with a current state 804, which can include information representing a state of an environment at a particular instant in time, and can include, but is not limited to, various symbol(s), feature(s), predicate(s), LTL formula(s), etc. In some instances, the current state 804 can be considered to be a part of the measured trace 802.

Based at least in part on the current state 804 at $T_0$ (e.g., an initial time), the search tree 800 can evolve motion of the vehicle over time, represented as a speculative trace 806, which can reflect speculations about the environment as various trajectories are considered for selection for the autonomous vehicle. In some examples, the speculative trace 806 can include predictions about other vehicles in the environment with the autonomous vehicle.

As illustrated, the search tree 800 can represent different potential actions, illustrated as a first action 808 (e.g., merge left), a second action 810 (e.g., continue straight), and a third action 812 (e.g., merge right). In some instances, the first action 808 can include a first candidate trajectory 814 based at least in part on a first reference trajectory 816; the second action 810 can include a second candidate trajectory 818 based at least in part on a second reference trajectory 820; and the third action 812 can include a third candidate trajectory 822 based at least in part on a third reference trajectory 824. Thus, it can be understood that multiple actions can be considered in parallel and that candidate trajectories can be determined for each action. Further, one or more costs can be determined for each action and/or candidate trajectories to facilitating selecting actions for the autonomous vehicle to follow.

It can be understood that the search tree 800 can represent speculation in the future as the passage of time moves from left to right in FIG. 8. Nodes have been labeled by time step and to distinguish between different speculative traces. For example, nodes $T_{1A}$, $T_{1B}$, and $T_{1C}$ represent three separate actions at a first time step $T_1$. In some instances, Progressive Widening can be used to determine when to add a new node, which may limit a maximum number of children of a given node based at least in part on a number of times a world state has been considered or visited by the search algorithm. In some instances, each action modeled in the search tree 800 has one or more associated termination conditions. When the search tree 800 reaches a termination condition associated with an action (e.g., completion of a lane change, traversing a section of road, passage of a period of time, movement above a threshold distance, threshold velocity, threshold acceleration, etc.), the search tree 800 may branch and choose a new action to follow. In some instances, a termination condition can be a logical combination of at least two termination conditions. The search can continue until a termination condition is reached for a trajectory or route as they related to a goal, such as a destination.

Within the search tree 800, various permutations of possible trajectories can be modeled and stored as an instance of a tree search to be searched and compared against temporal logic formulas (e.g., linear temporal logic (LTL), signal temporal logic (STL), etc.) determine whether trajectories are valid. For example, as the tree search is built, a snapshot (e.g., representing conditions in an environment) can evolve the context based on changing conditions (e.g., over time, as objects move, etc.), and the snapshot can be checked for compliance with the various TL formulas. If multiple trajectories are determined not to violate the TL formula, a trajectory with a lowest cost (or a highest performance, comfort, etc.) can be selected. For example, for various operations of the autonomous vehicle, or for various possible trajectories, a cost function may reward a lateral offset toward the inside of curves in the road, a cost function can penalize acceleration, jerk, lateral acceleration, yaw, steering angle, steering angle rate, etc.

In some instances, machine learning can be used to more accurately determine possible trajectories to investigate using the tree search based on a current state, predictive trajectories of other third-party vehicles, and/or learned trajectories in response to the current state(s) and/or tasks to be completed. For example, based on a current state of an environment, the tree search with machine learning can determine candidate trajectories that are most likely to result in satisfactory outcomes based on learned low-level policies (e.g., how to travel in a road lane, how to change lanes, how to stop, how not to tailgate, etc.) and learned high-level policies (e.g., previously selected actions with good outcomes).

As a non-limiting example, the system may evaluate the best option for proceeding as a choice between merging left (the first action 808), continuing straight (the second action 810), or merging right (the third action 812). An optimal candidate trajectory may be determined based on perturbing the trajectory (as described with respect to FIG. 6) and/or simulating vehicle dynamic with respect to a particular candidate trajectory. The action of the three having the lowest cost after optimization may then be selected for proceeding (e.g., merging left (the first action 708)).

Figure 9:
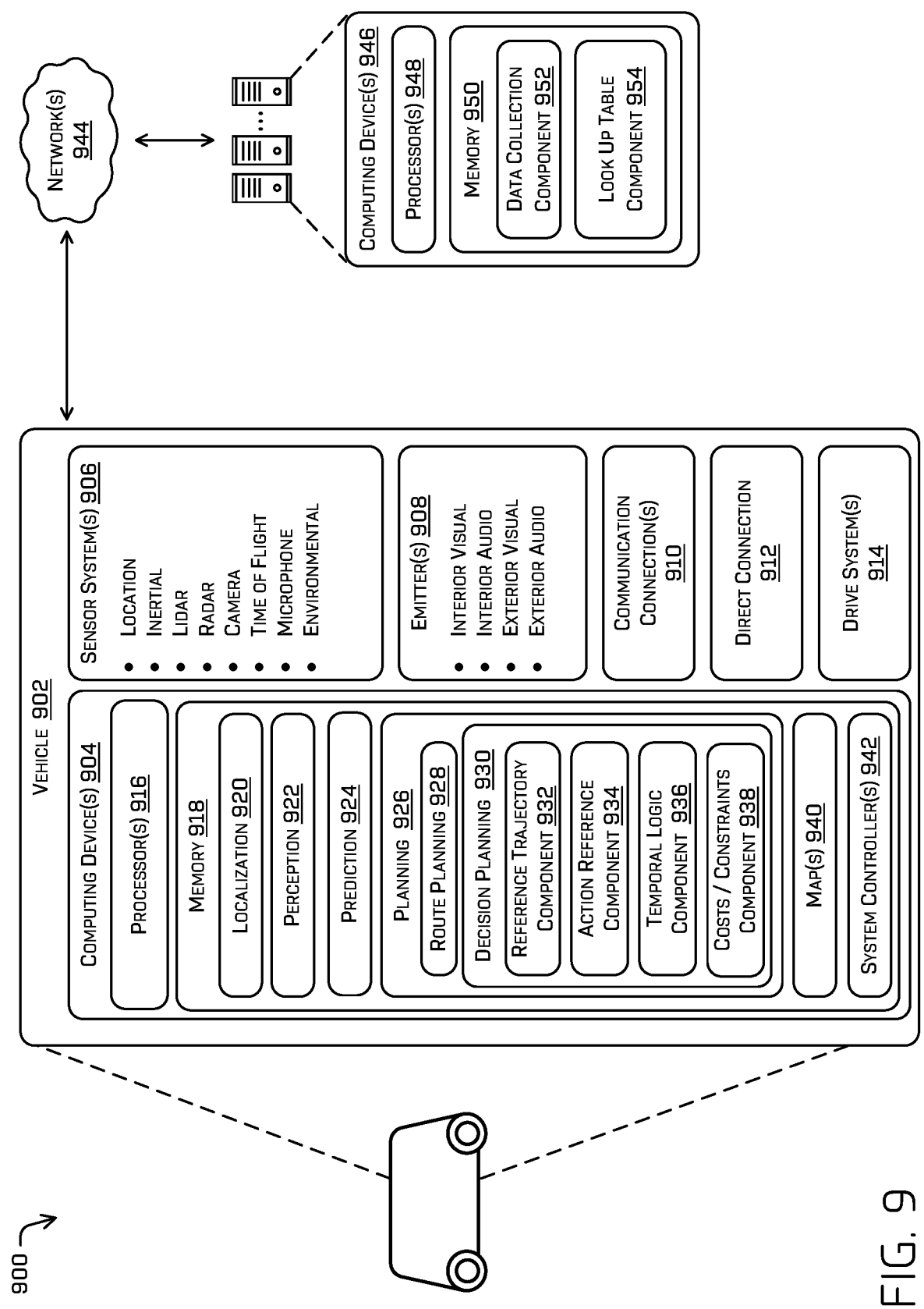
FIG. 9 depicts an example architecture for implementing the trajectory generation using curvature segments, as discussed herein.

FIG. 9 is a block diagram of an example system 900 for implementing the techniques for implementing trajectory generation to provide lateral offset biases and compensation for other factors, as described herein. In at least one example, the system 900 can include a vehicle 902. In the illustrated example system 900, the vehicle 902 is an autonomous vehicle; however, the vehicle 902 can be any other type of vehicle.

The vehicle 902 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 902 can be configured to control all functions from start to completion of the trip, including all parking functions, it may not include a driver and/or controls for driving the vehicle 902, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 902 can include one or more computing device(s) 904, one or more sensor system(s) 906, one or more emitter(s) 908, one or more communication connection(s) 910 (also referred to as communication devices and/or modems), at least one direct connection 912 (e.g., for physically coupling with the vehicle 902 to exchange data and/or to provide power), and one or more drive system(s) 914. The one or more sensor system(s) 906 can be configured to capture sensor data associated with an environment.

The one or more sensor system(s) 906 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 906 can include multiple instances of each of these or other types of sensors. For instance, the time-of-flight sensors can include individual time-of-flight sensors located at the corners, front, back, sides, and/or top of the vehicle 902. As another example, the camera sensors can include multiple cameras disposed at various locations about the exterior and/or interior of the vehicle 902. The one or more sensor system(s) 906 can provide input to the computing device 904.

The vehicle 902 can also include one or more emitter(s) 908 for emitting light and/or sound. The one or more emitter(s) 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 902 can also include one or more communication connection(s) 910 that enable communication between the vehicle 902 and one or more other local or remote computing device(s) (e.g., a remote teleoperation computing device) or remote services. For instance, the one or more communication connection(s) 910 can facilitate communication with other local computing device(s) on the vehicle 902 and/or the one or more drive system(s) 914. Also, the one or more communication connection(s) 910 can allow the vehicle 902 to communicate with other nearby computing device(s) (e.g., other nearby vehicles, traffic signals, etc.).

The one or more communications connection(s) 910 can include physical and/or logical interfaces for connecting the computing device 904 to another computing device or one or more external networks 944 (e.g., the Internet). For example, the one or more communications connection(s) 910 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 902 can include one or more drive system(s) 914. In some examples, the vehicle 902 can have a single drive system 914. In at least one example, if the vehicle 902 has multiple drive systems 914, individual drive systems 914 can be positioned on opposite ends of the vehicle 902 (e.g., the front and the rear, etc.). In at least one example, the drive system(s) 914 can include one or more sensor system(s) 906 to detect conditions of the drive system(s) 914 and/or the surroundings of the vehicle 902. By way of example and not limitation, the sensor system(s) 906 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 914. In some cases, the sensor system(s) 906 on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which can receive and preprocess data from the sensor system(s) 906 and to control operation of the various vehicle systems. In some examples, the drive system controller can include one or more processor(s) and memory communicatively coupled with the one or more processor(s). The memory can store one or more components to perform various functionalities of the drive system(s) 914. Furthermore, the drive system(s) 914 also include one or more communication connection(s) that enable communication by the respective drive system with one or more other local or remote computing device(s).

The computing device 904 can include one or more processor(s) 916 and memory 918 communicatively coupled with the one or more processor(s) 916. In the illustrated example, the memory 918 of the computing device 904 stores a localization component 920, a perception component 922, a prediction component 924, a planning component 926 comprising a route planning component 928 and a decision planning component 930 comprising a reference trajectory component 932, an action reference component 934, a temporal logic component 936, and a costs/constraints component 938, a maps component 940, and one or more system controller(s) 942. Though depicted as residing in the memory 918 for illustrative purposes, it is contemplated that the localization component 920, the perception component 922, the prediction component 924, the planning component 926, the route planning component 928, the decision planning component 930, the reference trajectory component 932, the action reference component 934, the temporal logic component 936, the costs/constraints component 938, the maps component 940, and the one or more system controller(s) 942 can additionally, or alternatively, be accessible to the computing device 904 (e.g., stored in a different component of vehicle 902) and/or be accessible to the vehicle 902 (e.g., stored remotely).

In memory 918 of the computing device 904, the localization component 920 can include functionality to receive data from the sensor system(s) 906 to determine a position of the vehicle 902. For example, the localization component 920 can include and/or request/receive a three-dimensional map of an environment and can continuously determine a location of the autonomous vehicle within the map. In some instances, the localization component 920 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 920 can provide data to various components of the vehicle 902 to determine an initial position of an autonomous vehicle for generating a trajectory, as discussed herein.

The perception component 922 can include functionality to perform object detection, segmentation, and/or classification. In some examples, the perception component 922 can provide processed sensor data that indicates a presence of an entity that is proximate to the vehicle 902 and/or a classification of the entity as an entity type (e.g., car, pedestrian, cyclist, building, tree, road surface, curb, sidewalk, unknown, etc.). In additional and/or alternative examples, the perception component 922 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 922 can use perception algorithms to determine a perception-based bounding box associated with an object in the environment based on sensor data. For example, the perception component 922 can receive image data and classify the image data to determine that an object is represented in the image data. Then, using detection algorithms, the perception component 922 can generate a two-dimensional bounding box and/or a perception-based three-dimensional bounding box associated with the object. The perception component 922 can further generate a three-dimensional bounding box associated with the object. As discussed above, the three-dimensional bounding box can provide additional information such as a location, orientation, pose, and/or size (e.g., length, width, height, etc.) associated with the object.

The perception component 922 can include functionality to store perception data generated by the perception component 922. In some instances, the perception component 922 can determine a track corresponding to an object that has been classified as an object type. For purposes of illustration only, the perception component 922, using sensor system(s) 906 can capture one or more images of an environment. The sensor system(s) 906 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 906, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 924 can generate one or more probability maps representing prediction probabilities of possible locations of one or more objects in an environment. For example, the prediction component 924 can generate one or more probability maps for vehicles, pedestrians, animals, and the like within a threshold distance from the vehicle 902. In some instances, the prediction component 924 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 926 can determine a path for the vehicle 902 to follow to traverse through an environment. For example, the planning component 926 can determine various routes and paths and various levels of detail. In some instances, the planning component 926 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 926 can generate an instruction for guiding the autonomous vehicle along at least a portion of the route from the first location to the second location. In at least one example, the planning component 926 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 926 can alternatively, or additionally, use data from the perception component 922 and/or the prediction component 924 to determine a path for the vehicle 902 to follow to traverse through an environment. For example, the planning component 926 can receive data from the perception component 922 and/or the prediction component 924 regarding objects associated with an environment. Using this data, the planning component 926 can determine a route to travel from a first location (e.g., a current location) to a second location (e.g., a target location) to avoid objects in an environment. In at least some examples, such a planning component 926 may determine there is no such collision free path and, in turn, provide a path which brings vehicle 902 to a safe stop avoiding all collisions and/or otherwise mitigating damage.

In some instances, the route planner component 928 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planner component 928 can perform a search, such as a graph search, on top of a map to identify a route to guide the autonomous vehicle from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planner component 928 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planner component 928 can identify two or more candidate routes for guiding the autonomous vehicle from the first location to the second location. In such examples, the route planner component 928 can rank the two or more candidate routes based on route planning constraint(s). Route planning constraint(s) can include rules of the road, travel time, travel distance, etc. In at least one example, the route planner component 928 can determine that a top-ranking candidate route is the route for guiding the autonomous vehicle from the first location to the second location. The route planner component 928 can output a sequence of waypoints corresponding to the route to the decision planner component 930.

In general, and in some instances, the decision planner component 930 can receive the route (e.g., the sequence of waypoints) and can generate an instruction for guiding the autonomous vehicle along at least a portion of the route from the first location to the second location. In at least one example, the decision planner component 930 can determine how to guide the autonomous vehicle from a first waypoint in the sequence of waypoints to a second waypoint in the sequence of waypoints. In some examples, the instruction can be a trajectory, or a portion of a trajectory. In such examples, the decision planner component 930 can generate a sequence of actions (e.g., drive down the road, accelerate, change lanes, turn left, etc.) to guide the autonomous vehicle along the route. In other examples, the instruction can be a policy. A policy can be used to determine a trajectory of the autonomous vehicle based on real-time processed sensor data received from sensor(s) on the autonomous vehicle.

Further, the decision planner component 930 can include the reference trajectory component 932, the action reference component 934, the temporal logic component 936, and the costs/constraints component 938.

The reference trajectory component 932 can be configured to generate an "default" route based at least in part on the route provided by the route planner component 928. In some instances, and as discussed above in connection with FIG. 8, the reference trajectory component 932 can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by the reference trajectory component 932 and/or can be received from an external computing device (e.g., from a teleoperations center).

Further, the reference trajectory component 932 may perform operations to determine lateral offset biases with respect to the reference trajectory as discussed above with respect to FIGS. 2-5.

The action reference component 934 can be configured to generate one or more candidate trajectories using curvature segments, as discussed herein. In some instances, the candidate trajectory can be based at least in part on the reference trajectory generated by the reference trajectory component 932. In some instances, discrete segments can collectively form a candidate trajectory, with curvature values associated with each segment. The segments can be initialized with a straight-line curvature, can be initialized with a curvature of the corresponding reference trajectory, or can be initialized with some other value. As discussed herein, the candidate trajectories can be perturbed to determine an optimal trajectory with respects to costs and/or constraints, as discussed herein.

The temporal logic component 936 can include functionality to receive data about an environment in which the autonomous vehicle is navigating and can develop temporal logic formulas to evaluate candidate trajectories generated by the action reference component 934. For example, the temporal logic component 936 can receive perception data from the perception component 922 to determine static or dynamic symbols in an environment. The temporal logic component 936 can generate features, predicates, and temporal logic formula based on the symbols in an environment that logically describe "correct" behavior of a vehicle navigating in the environment. The temporal logic component 936 can include linear temporal logic and/or signal temporal logic to evaluate candidate trajectories. In some instances, the temporal logic component 936 can generate automata as a finite state machine to evaluate trajectories over time.

The costs/constraints component 938 can be configured to determine costs and/or constraints associated with the various candidate trajectories. In some instances, examples of a constraint can include, but are not limited to, physical limitation based on dynamics of a vehicle or an environment, such as a maximum curvature of a trajectory, restrictions that a position of a vehicle cannot jump laterally, restrictions that a velocity must be continuous, restrictions that a curvature of a trajectory must be continuous, and the like. In some instances, examples of costs can include, but are not limited to, a distance between the vehicle and a reference trajectory, a distance between the vehicle and an obstacle, acceleration/deceleration, steering rate, velocity, comfort, performance, safety, rules of the road, and the like. In some examples, the lateral offset bias may be provided as a cost value that may bias or lower the cost for candidate trajectories determined for segments which are toward the inside of a curve in the road. Of course, as candidate trajectories deviate toward the inside of the curve in the road further than the lateral offset bias, a penalty may increase the cost of the candidate trajectories in a similar manner to penalties for deviation from the reference trajectory which increase the cost when no lateral offset bias is present. In such examples, the costs/constraints component 938 may determine the costs provided for lateral offset biases determined by the reference trajectory component 932.

The memory 918 can further include one or more maps 940 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 940 can include at least one map (e.g., images and/or a mesh). In some examples, the vehicle 902 can be controlled based at least in part on the map(s) 940. That is, the map(s) 940 can be used in connection with the localization component 920, the perception component 922 (and sub-components), the prediction component 924, and/or the planning component 926 to determine a location of the vehicle 902, identify objects in an environment, generate prediction probabilit(ies) associated with objects and/or the vehicle 902, and/or generate routes and/or trajectories to navigate within an environment.

In at least one example, the computing device 904 can include one or more system controller(s) 942, which can be configured to control steering, propulsion, braking, safety, emitters, communication, and other systems of the vehicle 902. These system controller(s) 942 can communicate with and/or control corresponding systems of the drive system(s) 914 and/or other components of the vehicle 902, which may be configured to operate in accordance with a path provided from the planning component 926.

The vehicle 902 can connect to computing device(s) 946 via network 944 and can include one or more processor(s) 948 and memory 950 communicatively coupled with the one or more processor(s) 948. In at least one instance, the one or more processor(s) 948 can be similar to the processor(s) 916 and the memory 950 can be similar to the memory 918. In the illustrated example, the memory 950 of the computing device(s) 946 stores a data collection component 952 and/or a look up table component 954. In at least one instance, the look up table component 954, after empirical testing and/or simulations, can be similar to the decision planning component 930. Though depicted as residing in the memory 950 for illustrative purposes, it is contemplated that the data collection component 952 and the look up table component 954 can additionally, or alternatively, be accessible to the computing device(s) 946 (e.g., stored in a different component of computing device(s) 946 and/or be accessible to the computing device(s) 946 (e.g., stored remotely).

As discussed herein, the data collection component 952 can include functionality to receive trip data relating to an actual path of travel and a planned path of travel (e.g., actual trajectory and planned trajectory). This data may be stored and/or provided to the look up table component 954.

The look up table component 954 can include functionality to evaluate the actual trajectories and planned trajectories. For example, the look up table component 954 can may actual trajectories and planned trajectories for a plurality of trips and determine, for a variety of cornering cases, the lateral offset of the probability distribution of the actual trajectories from the planned trajectories. Based on these lateral offsets, the look up table component 954 may generate look up tables for use by the vehicle 902 (e.g., by the decision planning module) as discussed above. Alternatively, the look up table component 954 may utilize the above derived information in generating reference trajectories that compensate for lateral offsets or logic for determining lateral offset biases in real time.

The processor(s) 916 of the computing device 904 and the processor(s) 948 of the computing device(s) 946 can be any suitable processor capable of executing instructions to process data and perform operations as described herein. By way of example and not limitation, the processor(s) 916 and 948 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 918 computing device 904 and the memory 950 of the computing device(s) 946 are examples of non-transitory computer-readable media. The memory 918 and 950 can store an operating system and one or more software applications, instructions, programs, and/or data to implement the methods described herein and the functions attributed to the various systems. In various implementations, the memory 918 and 950 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 918 and 950 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

FIGS. 2, 5, 6, 10, and 11 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 10:
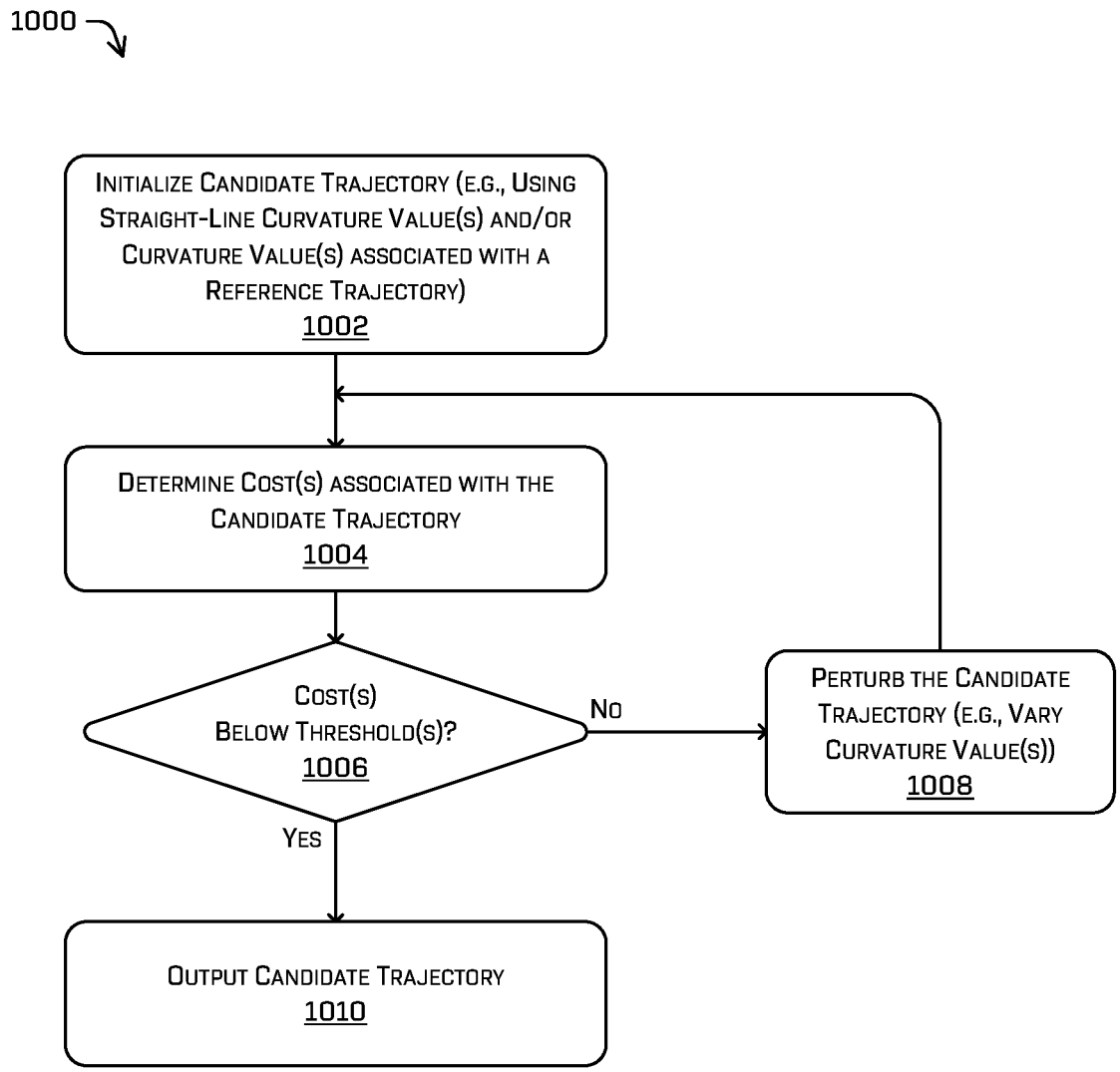
FIG. 10 depicts an example process for determining a candidate trajectory, determining costs, and perturbing the candidate trajectory based on the costs, as discussed herein.

FIG. 10 depicts an example process 1000 for determining a candidate trajectory, determining costs, and perturbing the candidate trajectory based on the costs, as discussed herein. For example, some or all of the process 1000 can be performed by one or more components in the FIG. 9, as described herein. For example, some or all of the process 1000 can be performed by the planning component 926 and/or system controller(s) 942.

At operation 1002, the process can include initializing a candidate trajectory (e.g., using straight-line curvature value(s) and/or curvature values associated with a reference trajectory). In some instances, the operation 1002 can include bounding the initialization values such that a segment associated with a frame of a candidate trajectory intersects with a reference line of a next frame, curvatures are continuous between frames, and the like. As discussed herein, the operation 1002 can include determining frames associated with a reference trajectory, determining an initial position of a vehicle, and extending a segment from the initial position to a reference line associated with the next frame. As discussed herein, a location of an intersection point between the segment and a reference line can be based at least in part on the curvature values. Segments for frames can be successively generated until a candidate trajectory extends from a current location of a vehicle to an end of a receding horizon, for example. Separation between frames may be based on, for example, constant time between frames, constant length between frames, constant curvature between frames, or the like.

At operation 1004, the process can include determining costs associated with the candidate trajectory. In some instances, the operation 1004 can also include determining constraints associated with the candidate trajectory. As discussed herein, examples of a constraint can include, but are not limited to, physical dynamics of a vehicle and/or an environment. In some instances, examples of costs can include, but are not limited to, a lateral offset bias, a distance between the vehicle and a reference trajectory, violating rules of the road (e.g., obey speed limits, stop at stop signs, etc.), a distance between the vehicle and an obstacle, acceleration/deceleration, steering rate, velocity, comfort, performance, safety, and the like. In some instances, costs can be determined for individual segments and summed or integrated across the candidate trajectory.

At operation 1006, the process can include determining whether the costs are below a threshold value. In some implementations, the operation 1006 can include determining whether the costs meet or exceed a threshold value. In some instances, the operation 1006 can include determining whether a difference in costs between a current iteration and a previous iteration is below a threshold value. If the costs are not below the threshold value (e.g., "no" in the operation 1006), the process continues to the operation 1008.

At operation 1008, the process can include perturbing the candidate trajectory, for example, by varying one or more curvature values of the segments comprising the candidate trajectory. For example, varying a curvature value of the individual segments can cause the candidate trajectory to "wiggle" around obstacles and/or to optimize the trajectory. In some instances, varying the curvature values can be performed by a machine learning algorithm that has been trained with various optimal trajectories when encountering obstacles. In some instances, varying the curvature values can be based at least in part on a projected-Newton method or a gradient descent, for example. After the candidate trajectory has been perturbed, thereby generating a revised candidate trajectory, costs associated with the revised candidate trajectory can be determined in the operation 1004, and the costs can be compared against the threshold value in the operation 1006.

If the costs are below the threshold value (e.g., "yes" in the operation 1006), the process continues to the operation 1010.

At operation 1010, the process can include outputting the candidate trajectory. In some instances, the candidate trajectory can be output to another selection step whereby a candidate trajectory can be selected from a plurality of optimized candidate trajectories corresponding to various actions (e.g., optimal trajectories for merging left, merging right, stopping, continuing straight, etc.). In some instances, the candidate trajectory can be output to system controller(s) 942 to control an autonomous vehicle to follow the candidate trajectory.

Figure 11:
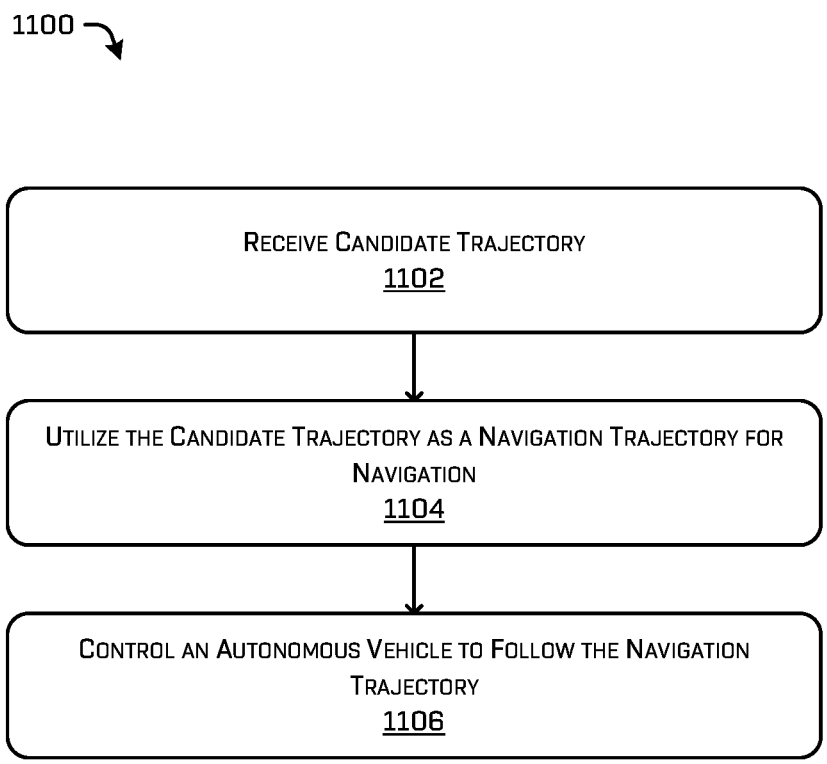
FIG. 11 depicts an example process for controlling an autonomous vehicle based at least in part on a candidate trajectory, as discussed herein.

FIG. 11 depicts an example process 1100 for controlling an autonomous vehicle based at least in part on a candidate trajectory, as discussed herein. For example, some or all of the process 1100 can be performed by one or more components in the FIG. 9, as described herein. For example, some or all of the process 1100 can be performed by the planning component 926 and/or system controller(s) 942.

At operation 1102, the process can include receiving a candidate trajectory. In some instances, the candidate trajectory received in the operation 1102 can include an optimized trajectory that is to be implemented by components of an autonomous vehicle. For example, the candidate trajectory of the operation 1102 may have been selected as an action to be performed and optimized to minimize one or more costs while respecting motion dynamics, safety, performance, mission requirements, and the like. In some instances, the candidate trajectory can be received by the decision planning component 930 and/or system controller(s) 942. In some instances, the operation 1102 can include simulating the vehicle dynamics with respect to the candidate trajectory and/or simulating various fallback or stopping operations with respect to the candidate trajectory or obstacles that may be present in an environment with respect to the candidate trajectory.

At operation 1104, the process can include utilizing the candidate trajectory as a navigation trajectory for navigation. For example, the candidate trajectory can be considered a "reference trajectory" such that the motion of the vehicle is controlled to follow the navigation trajectory. In some instances, the navigation trajectory can include a series of control inputs to the autonomous vehicle to receive in order to follow the candidate trajectory. In some instances, control inputs can include any number of acceleration values, steering angles, timing information, and the like.

At operation 1106, the process can include controlling an autonomous vehicle to follow the navigation trajectory. The operation 1106 can include generating a sequence of commands to command the autonomous vehicle to drive along the trajectory received in the operation 1102. In some instances, the commands generated in the operation 1106 can be relayed to a controller onboard the autonomous vehicle, such as the system controller(s) 942, to control the autonomous vehicle to traverse the trajectory. In some instances, the operation 1106 can include monitoring motion of the autonomous vehicle to confirm whether the autonomous vehicle is following the navigation trajectory and/or to determine whether another candidate trajectory can be generated. Although discussed in the context of an autonomous vehicle, the process 1100, and the techniques and systems described herein, can be applied to a variety of systems utilizing route planning and/or machine vision.

Embodiments of the present disclosure may include apparatuses for performing the operations herein. An apparatus may be specially constructed for the desired purposes, or it may comprise a general purpose device selectively activated or reconfigured by a program stored in the device.

In one or more examples, the present examples are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the examples can include a machine-readable medium having instructions stored on it. The instructions can be used to program any processor or processors (or other electronic devices) to perform a process or method according to the present exemplary examples. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more examples of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one example," "an example," "various examples," etc., may indicate that the example(s) of the present disclosure may include a particular feature, structure, or characteristic, but not every example necessarily includes the particular feature, structure, or characteristic. Further, repeated use of the phrase "in one example," or "in an exemplary example," do not necessarily refer to the same example, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular examples, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more examples have been described, various alterations, additions, permutations and equivalents thereof are included within the scope of the disclosure.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A system comprising: one or more processors; and one or more non-transitory computer-readable media storing instructions executable by the one or more processors, wherein the instructions, when executed, cause the system to perform operations comprising: receiving a reference trajectory for an autonomous vehicle to traverse an environment; determining a first transition point along the reference trajectory where a sign of a curvature value of the reference trajectory changes from a first sign to a second sign; determining a second transition point along the reference trajectory where the sign of the curvature value of the reference trajectory changes from the second sign to the first sign; determining a segment comprising a portion of the reference trajectory between the first transition point and the second transition point; determining a lateral offset bias associated with the segment based at least in part on a curvature of the segment; determining an output trajectory for the autonomous vehicle based at least in part on the lateral offset bias, wherein the lateral offset bias biases the determining of the output trajectory toward an inside of a curve associated with the segment; and controlling the autonomous vehicle based at least in part on the output trajectory.

B. The system of clause A, wherein the determining of the lateral offset bias is based at least in part on one or more of a speed of the autonomous vehicle associated with traversing the segment or a lateral acceleration of the autonomous vehicle associated with the segment.

C. The system of clause A, wherein: determining the output trajectory comprises determining an offset cost determined based at least in part on a Euclidean distance of the autonomous vehicle from a position offset from the reference trajectory by the lateral offset bias.

D. The system of clause C, wherein determining the output trajectory comprises determining an output trajectory based at least in part on an optimization of a cost, the cost including the offset cost.

E. The system of clause A, wherein the determining the lateral offset bias comprises: determining a revised reference trajectory that comprises a shifted segment associated with the segment comprising a lateral position shifted toward the inside of the curve by an offset distance.

F. A method comprising: receiving a reference trajectory for a vehicle to traverse an environment; determining a segment associated with the reference trajectory; determining a lateral offset bias associated with the segment based at least in part on a curvature of the segment; determining an output trajectory for the vehicle based at least in part on the lateral offset bias; and transmitting the output trajectory to a controller of a vehicle configured to control the vehicle based at least in part on the output trajectory.

G. The method of clause F, wherein the lateral offset bias is associated with biasing the output trajectory toward a side of a curve associated with the segment.

H. The method of clause F, wherein the determining of the lateral offset bias is based at least in part on one or more of a speed of the vehicle associated with traversing the segment or a lateral acceleration of the vehicle associated with traversing the segment.

I. The method of clause F, wherein: determining the output trajectory is based at least in part on optimizing a cost for controlling the vehicle, the cost comprising an offset cost based at least in part on a current position of the vehicle, the reference trajectory, and the lateral offset bias.

J. The method of clause I, wherein the offset cost is based at least in part on a distance between the current position of the vehicle from the reference trajectory offset by the lateral offset bias.

K. The method of clause H, wherein the determining the lateral offset bias comprises querying a lookup table based at least in part on one or more of the speed of the vehicle or the lateral acceleration of the vehicle.

L. The method of clause F, wherein the lateral offset bias is determined based at least in part on a statistical model of a lateral tracking error.

M. The method of clause F, further comprising: determining a first transition point along the reference trajectory where a sign of a curvature value of the reference trajectory changes from a first sign to a second sign; and determining a second transition point along the reference trajectory where the sign of the curvature value of the reference trajectory changes from the second sign to the first sign; wherein determining the segment associated with the reference trajectory comprises determining the segment as a portion of the reference trajectory associated with the first transition point and the second transition point.

N. One or more non-transitory computer-readable media storing instructions that, when executed, cause one or more processors to perform operations comprising: receiving a reference trajectory for a vehicle to traverse an environment; determining a segment associated with the reference trajectory; determining a lateral offset bias associated with the segment based at least in part on a curvature of the segment; determining an output trajectory for the vehicle based at least in part on the lateral offset bias; and transmitting the output trajectory to a controller of a vehicle configured to control the vehicle based at least in part on the output trajectory.

O. The one or more non-transitory computer-readable media of clause N, wherein the lateral offset bias is associated with biasing the output trajectory toward a side of a curve associated with the segment.

P. The one or more non-transitory computer-readable media of clause N, wherein the determining of the lateral offset bias is based at least in part on one or more of a speed of the vehicle associated with traversing the segment or a lateral acceleration to be experienced by the vehicle associated with traversing the segment.

Q. The one or more non-transitory computer-readable media of clause P, wherein determining the output trajectory is based at least in part on optimizing a cost for controlling the vehicle, the cost comprising an offset cost based at least in part on a current position of the vehicle, the reference trajectory, and the lateral offset bias.

R. The one or more non-transitory computer-readable media of clause Q, wherein the offset cost is based at least in part on a distance between the current position of the vehicle from the reference trajectory offset by the lateral offset bias.

S. The one or more non-transitory computer-readable media of clause P, wherein the determining the lateral offset bias comprises querying a lookup table based at least in part on one or more of the speed of the vehicle or the lateral acceleration of the vehicle.

T. The one or more non-transitory computer-readable media of clause N, wherein the lateral offset bias is determined based at least in part on a statistical model of a lateral tracking error.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A system comprising:
one or more processors; and
one or more non-transitory computer-readable media storing instructions executable by the one or more processors, wherein the instructions, when executed, cause the system to perform operations comprising:
receiving a reference trajectory for an autonomous vehicle to traverse an environment;
determining a first transition point along the reference trajectory where a sign of a curvature value of the reference trajectory changes from a first sign to a second sign, wherein the first sign is one of a positive sign or a negative sign and the second sign is an other of the positive sign or the negative sign;
determining a second transition point along the reference trajectory where the sign of the curvature value of the reference trajectory changes from the second sign to the first sign;
determining a segment comprising a portion of the reference trajectory between the first transition point and the second transition point;
determining a lateral offset bias associated with the segment based at least in part on a curvature of the segment;
determining an output trajectory for the autonomous vehicle based at least in part on the lateral offset bias and the segment of the reference trajectory, wherein the lateral offset bias biases the determining of the output trajectory toward an inside of a curve associated with the segment; and
controlling the autonomous vehicle based at least in part on the output trajectory.

2. The system of claim 1, wherein the determining of the lateral offset bias is based at least in part on one or more of a speed of the autonomous vehicle associated with traversing the segment or a lateral acceleration of the autonomous vehicle associated with the segment.

3. The system of claim 1, wherein:
determining the output trajectory comprises determining an offset cost determined based at least in part on a Euclidean distance of the autonomous vehicle from a position offset from the reference trajectory by the lateral offset bias.

4. The system of claim 3, wherein determining the output trajectory comprises determining the output trajectory based at least in part on an optimization of a cost, the cost including the offset cost.

5. The system of claim 1, wherein the determining the lateral offset bias comprises:
determining a revised reference trajectory that comprises a shifted segment associated with the segment comprising a lateral position shifted toward the inside of the curve by an offset distance.

6. A method comprising:
receiving a reference trajectory for a vehicle to traverse an environment;
determining a segment of the reference trajectory;
determining a lateral offset bias associated with the segment based at least in part on a curvature of the segment;
determining an output trajectory for the vehicle based at least in part on the lateral offset bias and the segment of the reference trajectory; and
transmitting the output trajectory to a controller of a vehicle configured to control the vehicle based at least in part on the output trajectory.

7. The method of claim 6, wherein the lateral offset bias is associated with biasing the output trajectory toward a side of a curve associated with the segment.

8. The method of claim 6, wherein the determining of the lateral offset bias is based at least in part on one or more of a speed of the vehicle associated with traversing the segment or a lateral acceleration of the vehicle associated with traversing the segment.

9. The method of claim 8, wherein the determining the lateral offset bias comprises querying a lookup table based at least in part on one or more of the speed of the vehicle or the lateral acceleration of the vehicle.

10. The method of claim 6, wherein:
determining the output trajectory is based at least in part on optimizing a cost for controlling the vehicle, the cost comprising an offset cost based at least in part on a current position of the vehicle, the reference trajectory, and the lateral offset bias.

11. The method of claim 10, wherein the offset cost is based at least in part on a distance between the current position of the vehicle from the reference trajectory offset by the lateral offset bias.

12. The method of claim 6, wherein the lateral offset bias is determined based at least in part on a statistical model of a lateral tracking error.

13. The method of claim 6, further comprising:
determining a first transition point along the reference trajectory where a sign of a curvature value of the reference trajectory changes from a first sign to a second sign wherein the first sign is one of a positive sign or a negative sign and the second sign is an other of the positive sign or the negative sign; and
determining a second transition point along the reference trajectory where the sign of the curvature value of the reference trajectory changes from the second sign to the first sign;
wherein determining the segment of the reference trajectory comprises determining the segment as a portion of the reference trajectory associated with the first transition point and the second transition point.

14. One or more non-transitory computer-readable media storing instructions that, when executed, cause one or more processors to perform operations comprising:
receiving a reference trajectory for a vehicle to traverse an environment;
determining a segment of the reference trajectory;
determining a lateral offset bias associated with the segment based at least in part on a curvature of the segment;
determining an output trajectory for the vehicle based at least in part on the lateral offset bias and the segment of the reference trajectory; and
transmitting the output trajectory to a controller of the vehicle configured to control the vehicle based at least in part on the output trajectory.

15. The one or more non-transitory computer-readable media of claim 14, wherein the lateral offset bias is associated with biasing the output trajectory toward a side of a curve associated with the segment.

16. The one or more non-transitory computer-readable media of claim 14, wherein the determining of the lateral offset bias is based at least in part on one or more of a speed of the vehicle associated with traversing the segment or a lateral acceleration to be experienced by the vehicle associated with traversing the segment.

17. The one or more non-transitory computer-readable media of claim 16, wherein determining the output trajectory is based at least in part on optimizing a cost for controlling the vehicle, the cost comprising an offset cost based at least in part on a current position of the vehicle, the reference trajectory, and the lateral offset bias.

18. The one or more non-transitory computer-readable media of claim 17, wherein the offset cost is based at least in part on a distance between the current position of the vehicle from the reference trajectory offset by the lateral offset bias.

19. The one or more non-transitory computer-readable media of claim 16, wherein the determining the lateral offset bias comprises querying a lookup table based at least in part on one or more of the speed of the vehicle or the lateral acceleration of the vehicle.

20. The one or more non-transitory computer-readable media of claim 14, wherein the lateral offset bias is determined based at least in part on a statistical model of a lateral tracking error.

* * * * *